United States Patent
Holtcamp et al.

(10) Patent No.: US 9,676,882 B2
(45) Date of Patent: Jun. 13, 2017

(54) PROCESSES USING STAGED HYDROGEN ADDITION

(71) Applicant: ExxonMobil Chemical Patents Inc., Baytown, TX (US)

(72) Inventors: Matthew W. Holtcamp, Huffman, TX (US); Jian Yang, Houston, TX (US); Celestino M. Perez, Jr., Pasadena, TX (US); Gregory S. Day, College Station, TX (US); Rohan A. Hule, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/003,992

(22) Filed: Jan. 22, 2016

(65) Prior Publication Data

US 2016/0137763 A1 May 19, 2016

Related U.S. Application Data

(62) Division of application No. 14/510,806, filed on Oct. 9, 2014, now Pat. No. 9,279,024.

(60) Provisional application No. 61/896,291, filed on Oct. 28, 2013.

(51) Int. Cl.

| | | |
|---|---|---|
| *C08L 23/10* | (2006.01) | |
| *C08L 23/12* | (2006.01) | |
| *C08F 2/04* | (2006.01) | |
| *C08F 4/6592* | (2006.01) | |
| *C08F 210/06* | (2006.01) | |
| *C08F 4/76* | (2006.01) | |
| *C08F 10/06* | (2006.01) | |
| *C08F 2/00* | (2006.01) | |
| *C08F 4/659* | (2006.01) | |
| *C08F 110/06* | (2006.01) | |

(52) U.S. Cl.
CPC ............ *C08F 210/06* (2013.01); *C08F 2/001* (2013.01); *C08F 4/65927* (2013.01); *C08F 4/76* (2013.01); *C08F 10/06* (2013.01); *C08L 23/10* (2013.01); *C08L 23/12* (2013.01); *C08F 4/65912* (2013.01); *C08F 4/65916* (2013.01); *C08F 110/06* (2013.01)

(58) Field of Classification Search
CPC .......... C08L 23/10; C08L 23/14; C08L 23/12; C08F 2/001; C08F 4/65927
See application file for complete search history.

(56) References Cited

U.S. PATENT DOCUMENTS

| | | |
|---|---|---|
| 5,166,268 A | 11/1992 | Ficker |
| 5,250,631 A | 10/1993 | McCullough, Jr. |
| 5,258,464 A | 11/1993 | McCullough, Jr. et al. |
| 5,362,782 A | 11/1994 | McCullough, Jr. et al. |
| 5,948,839 A | 9/1999 | Chatterjee |
| 5,990,242 A | 11/1999 | Naga et al. |
| 6,156,854 A | 12/2000 | Shamshoum et al. |
| 6,207,750 B1 | 3/2001 | Lin et al. |
| 6,429,250 B1 | 8/2002 | Rohrmann |
| 8,557,917 B2 | 10/2013 | Leskinen et al. |
| 2001/0044506 A1 | 11/2001 | Mehta et al. |
| 2004/0054098 A1 | 3/2004 | Weng et al. |
| 2004/0132935 A1 | 7/2004 | Arjunan et al. |
| 2011/0034649 A1 | 2/2011 | Standaert et al. |
| 2011/0081817 A1 | 4/2011 | Bieser et al. |
| 2011/0160373 A1 | 6/2011 | Bernreitner et al. |
| 2014/0221514 A1 | 8/2014 | Datta et al. |
| 2014/0221515 A1 | 8/2014 | Datta et al. |
| 2015/0025206 A1 | 1/2015 | Yang et al. |
| 2015/0025207 A1 | 1/2015 | Canich et al. |
| 2015/0147552 A1 | 5/2015 | Holtcamp et al. |

FOREIGN PATENT DOCUMENTS

| | | |
|---|---|---|
| WO | WO 01/32757 | 5/2001 |
| WO | WO 02/02576 | 1/2002 |
| WO | WO 2007/071446 | 6/2007 |

OTHER PUBLICATIONS

Langston, Justin A. et al., "Synthesis and characterization of long chain branched isotactic polypropylene via metallocene, catalyst and T-reagent," Macromolecules, 2007, vol. 40, No. 9, pp. 2712-2720.

*Primary Examiner* — Caixia Lu
(74) *Attorney, Agent, or Firm* — Kevin M. Faulkner; Catherine L. Bell

(57) ABSTRACT

This invention relates to processes using staged hydrogen addition in propylene polymerization. Using this process, broad/bi-modal MWD iPP with excellent stiffness properties and melt flow rates were produced.

24 Claims, 2 Drawing Sheets

PROCESSES USING STAGED HYDROGEN ADDITION

PRIORITY

This application is a divisional of U.S. Ser. No. 14/510,806, filed Oct. 9, 2014 which claims priority to and the benefit of U.S. Ser. No. 61/896,291, filed Oct. 28, 2013.

FIELD OF THE INVENTION

This invention relates to processes using staged hydrogen addition in propylene polymerization. Using this process, broad/bi-modal molecular weight distribution isotactic propylene polymers with excellent stiffness properties and melt flow rates are produced.

BACKGROUND OF THE INVENTION

Propylene impact copolymers are commonly used in a variety of applications where strength and impact resistance are desired, such as molded and extruded parts (e.g. automobile parts, household appliances, luggage and furniture). Propylene homopolymers are often unsuitable for such applications because they are too brittle and have low impact resistance particularly at low temperature, whereas propylene impact copolymers are specifically engineered for applications such as these.

A typical propylene impact copolymer contains two phases or components, a homopolymer component and a copolymer component. These two components are usually produced in a sequential polymerization process wherein the homopolymer produced in a first reactor is transferred to a second reactor where copolymer is produced and incorporated within the matrix of the homopolymer component. The copolymer component has rubbery characteristics and provides the desired impact resistance, whereas the homopolymer component provides overall stiffness.

Many process variables influence the resulting impact copolymer and these have been studied and manipulated to obtain various effects. For example, U.S. Pat. No. 5,166,268 describes a "cold forming" process for producing propylene impact copolymers where finished articles are fabricated at temperatures below the melting point of the preformed material, in this case, the propylene impact copolymer. The described process uses a propylene impact copolymer comprised of either a homopolymer or crystalline copolymer matrix (first component) and at least ten percent by weight of an "interpolymer" of ethylene and a small amount of propylene (the second component). Adding comonomer to the first component is described as reducing its stiffness. The ethylene/propylene copolymer second component is reported to assist the finished, cold-formed article in better maintaining its shape.

U.S. Pat. No. 5,258,464 describes propylene impact copolymers with improved resistance to "stress whitening." Stress whitening refers to the appearance of white spots at points of impact or other stress. These otherwise conventional propylene impact copolymers have first and second components characterized by a numerical ratio of the second component intrinsic viscosity to the first component intrinsic viscosity which is near unity.

In U.S. Pat. No. 5,362,782, nucleating agent is added to propylene impact copolymers having a numerical ratio of the intrinsic viscosity of the copolymer rubber phase (second component) to the intrinsic viscosity of the homopolymer phase (first component) which is near unity, and an ethylene content of the copolymer phase in the range of 38% to 60% by weight. These propylene, impact copolymers are described as producing articles having good clarity as well as impact strength and resistance to stress whitening. The nucleating agents are reported to increase stiffness and impact strength.

U.S. Pat. No. 5,250,631 describes a propylene impact copolymer having a homopolypropylene first component and an ethylene/butene/propylene terpolymer second component. Again, the goal is to obtain high impact strength coupled with resistance to stress whitening.

Propylene impact copolymers are also used to produce films as described in U.S. Pat. No. 5,948,839. The impact copolymer described in this patent contains a conventional first component and 25 to 45 weight percent ethylene/propylene second component having from 55 to 65 weight percent ethylene. This impact copolymer composition has a melt flow of from 7 to 60 dg/min. Such films are used in articles such as diapers.

More recently, efforts have been made to prepare propylene impact copolymers using newly developed metallocene catalysis technology in order to capitalize on the benefits such catalysts provide. Homopolymers prepared with such "single-site" catalysts often have narrow molecular weight distributions, and low extractables and a variety of other favorable properties associated therewith. Metallocene catalyzed copolymers typically have narrow composition distributions in addition to narrow molecular weight distribution and low extractables.

Unfortunately, known metallocenes are not able to provide copolymer components with high enough molecular weight under commercially relevant process conditions. The resulting propylene impact copolymers tend to have poor impact strength compared to their conventionally catalyzed counterparts.

U.S. Pat. No. 5,990,242 approaches this problem by using an ethylene/butene (or higher alpha-olefin) copolymer second component, rather than a propylene copolymer, prepared using a hafnocene type metallocene. Such hafnium metallocenes are generally useful for producing relatively higher molecular weight polymers, however, their activities are much lower than the more commonly used zirconocenes. In any event, the second component molecular weights and intrinsic viscosities are lower than desired for good impact strength.

Other references of interest include US 2011/0034649; US 2011/0081817; WO 2007/071446; U.S. Pat. No. 6,429,250; US 2011/0160373; U.S. Pat. No. 8,557,917; WO 01/32757 and U.S. Pat. No. 6,207,750.

Accordingly, there is need for new catalysts and/or processes that produce polypropylene materials that meet the needs for use in impact resistant applications, such as a good stiffness toughness balance.

SUMMARY OF THE INVENTION

New propylene impact copolymer compositions are presented having the benefits of metallocene catalyzed polymers in addition to properties needed for high impact strength applications. Importantly, these polymers can be economically produced using commercial-scale processes and conditions.

Using metallocene catalysts under two-stage hydrogen addition conditions, isotactic polypropylene (iPP) with excellent stiffness properties and melt flow ratios was obtained.

In one aspect, this invention relates to a process to polymerize propylene comprising: 1) contacting propylene, optionally with a comonomer, with a catalyst system comprising an activator and a catalyst compound represented by the formula:

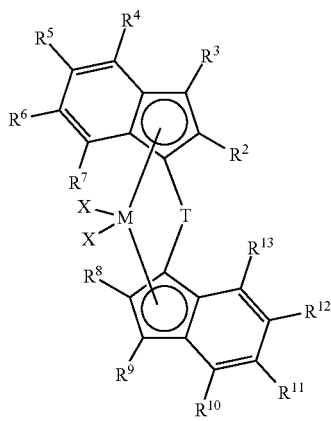

where:
M is a group 4 metal;
T is a bridging group;
each X is, independently, an anionic leaving group;
each $R^2$, $R^3$, $R^5$, $R^6$, $R^7$, $R^8$, $R^9$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a $-NR'_2$, $-SR'$, $-OR$, $-OSiR'_3$ or $-PR'_2$ radical, wherein R' is one of a halogen atom, a $C_1$-$C_{10}$ alkyl group, or a $C_6$-$C_{10}$ aryl group, provided that $R^2$ and $R^8$ may not be hydrogen;
$R^4$ and $R^{10}$ are, independently, a substituted or unsubstituted aryl group;
2) polymerizing the propylene and optional comonomer for a time period, A;
3) adding hydrogen or other chain termination agent and optional comonomer to the polymerization after time period A;
4) polymerizing in the presence of at least 1 mmol hydrogen per mole of propylene for a time period, B, where time period A is at least as long as time period B and the hydrogen concentration during time period B is at least three times greater than the hydrogen concentration in time period A; and
5) obtaining a propylene polymer composition having:
  a) at least 50 mol % propylene;
  b) a 1% Secant flexural modulus of at least 1500 MPa;
  c) an Mw/Mn of at least 5;
  d) a melt flow rate of 50 dg/min or more (230° C., 2.16 kg);
  e) a multimodal Mw/Mn; and
  f) more than 15 and less than 200 regio defects per 10,000 propylene units.

In another aspect, the process further includes:
adding comonomer selected from ethylene and a $C_4$-$C_{40}$ olefin monomer to the polymerization after time period B for a time period, C; and obtaining a propylene polymer composition having:
  a) at least 50 mol % propylene;
  b) at least 1 mol % comonomer;
  c) a 1% secant flexural modulus of at least 1500 MPa;
  d) an Mw/Mn of at least 5;
  e) a melt flow rate of 50 dg/min or more (230° C., 2.16 kg);
  f) more than 15 and less than 200 regio defects per 10,000 propylene units; and
  g) a CDBI of 50% or more.

In still another aspect, a propylene polymer composition is provided that includes at least 50 mole % propylene, said polymer having a 1% secant flexural modulus of at least 1500 MPa, an Mw/Mn of at least 5, a melt flow rate of 50 dg/min or more, and preferably more than 15 and less than 200 regio defects per 10,000 propylene units.

In still another aspect, a propylene polymer composition is provided that includes at least 50 mole % propylene and at least 1 mol % comonomer, said polymer having a CDBI of 50% or more, a 1% secant flexural modulus of at least 1500 MPa, an Mw/Mn of at least 5, a melt flow rate of 50 dg/min or more, and more than 15 and less than 200 regio defects per 10,000 propylene units.

In still another aspect, a propylene polymer composition is provided that comprises at least 50 mole % propylene, has a 1% secant flexural modulus of at least 1500 MPa, an Mw/Mn of at least 5, a multimodal Mw/Mn as determined by GPC-DRI, a melt flow rate of 50 dg/min or more, and an RCSV ratio (1 sec-1 to 2000 sec-1) of Y or more, where Y=38000X−1.559, and X is the melt flow rate in dg/min of the propylene polymer.

DEFINITIONS

Figure 1:
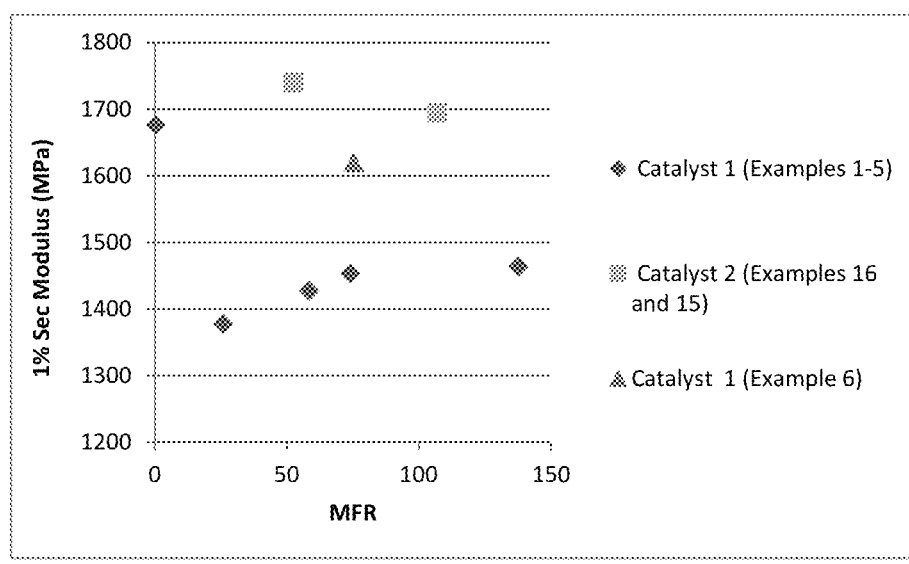
FIG. 1 is a graph of the polymer 1% Secant flexural modulus vs. melt flow rate (dg/min) of the polypropylene produced according to polymerization examples 1-6, 15 and 16.
Figure 2:
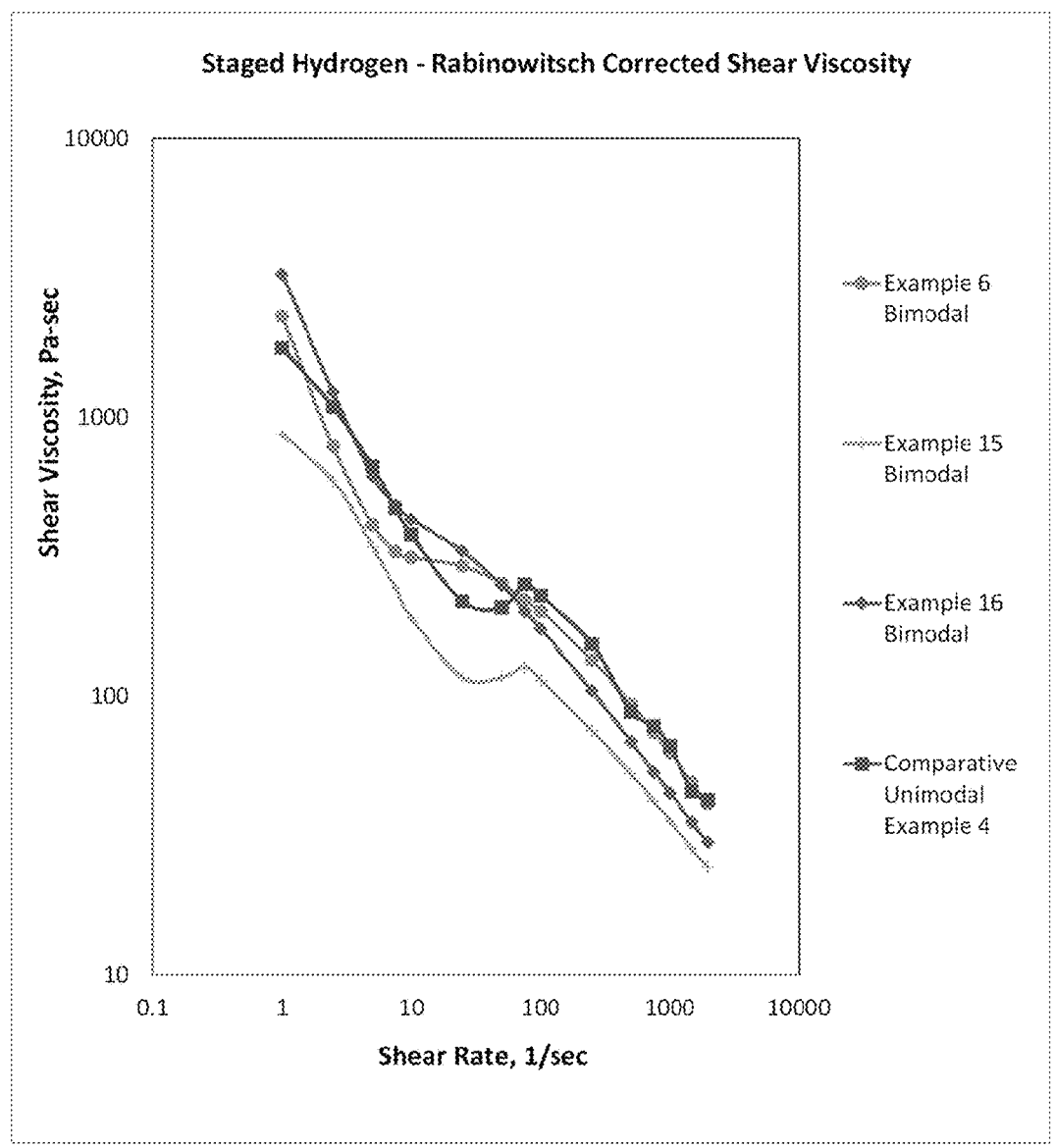
FIG. 2 is a graph of shear viscosity versus shear rate for examples 4, 6, 15, and 16.

For the purposes of this invention and the claims thereto, the new numbering scheme for the Periodic Table Groups is used as described in Chemical and Engineering News, 63(5), p. 27 (1985). Therefore, a "Group 4 metal" is an element from Group 4 of the Periodic Table, e.g. Hf, Zr and Ti.

Unless otherwise indicated, "catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat-1 hr-1. Unless otherwise indicated, "conversion" is the amount of monomer that is converted to polymer product, and is reported as mol % and is calculated based on the polymer yield and the amount of monomer fed into the reactor. Unless otherwise indicated, "catalyst activity" is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For the purposes of this invention, ethylene shall be considered an α-olefin. An "alkyl" group is a linear, branched, or cyclic radical of carbon and hydrogen having at least one double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene"

content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such as Mn of less than 25,000 g/mol, preferably less than 2,500 g/mol) or a low number of mer units (such as 75 mer units or less). An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

The terms "hydrocarbyl radical," "hydrocarbyl" and "hydrocarbyl group" are used interchangeably throughout this document. Likewise, the terms "group", "radical", and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

Substituted hydrocarbyl radicals are radicals in which at least one hydrogen atom has been substituted with at least one functional group such as NR*2, OR*, SeR*, TeR*, PR*2, AsR*2, SbR*2, SR*, BR*2, SiR*3, GeR*3, SnR*3, PbR*3 and the like, or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)2-, —Ge(R*)2-, —Sn(R*)2-, —Pb(R*)2- and the like, where R* isindependently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF3).

Substituted halocarbyl radicals are radicals in which at least one halocarbyl hydrogen or halogen atom has been substituted with at least one functional group such as NR*2, OR*, SeR*, TeR*, PR*2, AsR*2, SbR*2, SR*, BR*2, SiR*3, GeR*3, SnR*3, PbR*3 and the like, or where at least one non-carbon atom or group has been inserted within the halocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)2-, —Ge(R*)2-, —Sn(R*)2-, —Pb(R*)2- and the like, where R* isindependently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include SiH3, SiH2R*, SiHR*2, SiR*3, SiH2(OR*), SiH(OR*)2, Si(OR*)3, SiH2(NR*2), SiH(NR*2)2, Si(NR*2)3, and the like, where R* isindependently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include GeH3, GeH2R*, GeHR*2, GeR*3, GeH2(OR*), GeH(OR*)2, Ge(OR*)3, GeH2(NR*2), GeH(NR*2)2, Ge(NR*2)3, and the like, where R* isindependently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of Groups 1-17 of the periodic table either alone or connected to other elements by covalent or other interactions, such as ionic, van der Waals forces, or hydrogen bonding. Examples of functional groups include carboxylic acid, acid halide, carboxylic ester, carboxylic salt, carboxylic anhydride, aldehyde and their chalcogen (Group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, sulfonates, phosphines, phosphates, other phosphorus compounds, silanes, boranes, borates, alanes, aluminates. Functional groups may also be taken broadly to include organic polymer supports or inorganic support material, such as alumina, and silica. Preferred examples of polar groups include NR*2, OR*, SeR*, TeR*, PR*2, AsR*2, SbR*2, SR*, BR*2, SnR*3, PbR*3 and the like, where R* isindependently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure. Also preferred are sulfonate radicals, S(=O)2OR*, where R* is defined as above. Examples include SO3Me (mesylate), SO3(4-tosyl) (tosylate), SO3CF3 (triflate), SO3(n-C4F9) (nonaflate) and the like.

An aryl group is defined to be a single or multiple fused ring group where at least one ring is aromatic. Examples of aryl groups include phenyl, benzyl, carbozyl, naphthyl, and the like.

In using the terms "substituted cyclopentadienyl," or "substituted indenyl," or "substituted aryl", the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

In some embodiments of the invention, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, butylphenyl, dibutylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The term "continuous" means a system that operates without interruption or cessation. For example, a continuous process to produce a polymer would be one where the reactants are continually introduced into one or more reactors and polymer product is continually withdrawn.

As used herein, Mn is number average molecular weight, Mw is weight average molecular weight, Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weights (e.g., Mw, Mn, Mz) are g/mol and are determined by GPC-DRI as described below. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane, OTf is trifluoromethanesulfonate.

Room temperature (RT) is 23° C. unless otherwise indicated.

A "catalyst system" is a combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of this specification and the claims appended thereto, when referring polymerizing in the presence of at least X mmol hydrogen per mole of propylene, the ratio is determined based upon the amounts of hydrogen and propylene fed into the reactor. Likewise when referring to a hydrogen concentration during time period B that is at least three times greater than the hydrogen concentration in time period A, the concentrations are determined by measuring the hydrogen amounts fed into the reactor during time periods A and B.

DETAILED DESCRIPTION

In one aspect, a process to polymerize propylene is provided that includes:
1) contacting propylene, optionally with a comonomer, with a catalyst system comprising an activator and a catalyst compound represented by the formula:

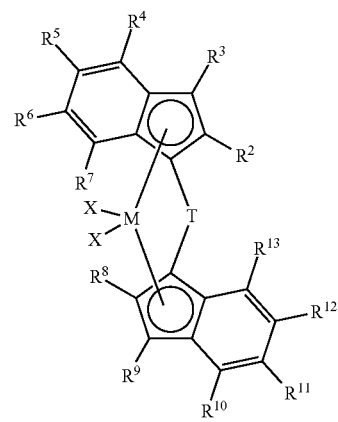

where:
M is a group 4 metal (preferably Hf or Zr);
T is a bridging group;
X is an anionic leaving group;

each $R^2$, $R^3$, $R^5$, $R^6$, $R^7$, $R^8$, $R^9$, $R^{11}$, $R^{12}$, and $R^{13}$ is independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR, —OSiR'$_3$ or —PR'$_2$ radical, wherein R' is one of a halogen atom, a $C_1$-$C_{10}$ alkyl group, or a $C_6$-$C_{10}$ aryl group, provided that $R^2$ and $R^8$ may not be hydrogen; and $R^4$ and $R^{10}$ are, independently, a substituted or unsubstituted aryl group;

2) polymerizing the propylene and optional comonomer for a time period, A, to produce Component A;

3) adding hydrogen or other chain termination agent and optional comonomer to the polymerization after time period A;

4) polymerizing in the presence of at least 1 mmol hydrogen per mole of propylene (preferably at least 5 mmol, preferably at least 10 mmol, preferably at least 15 mmol ppm, preferably at least 20 mmol, preferably at least 30 mmol, preferably at least 50 mmol ppm per mol of propylene) for a time period, B, where time period A is at least as long as (preferably 1.5 times longer than) time period B and the hydrogen concentration during time period B is at least three times greater than the hydrogen concentration in time period A; and 5) obtaining a propylene polymer composition having:
   a) at least 50 mol % propylene;
   b) a 1% Secant flexural modulus of at least 1500 MPa (ASTM D 790 (A, 1.0 mm/min));
   c) an Mw/Mn of at least 5 (GPC-DRI);
   d) a melt flow rate of 50 dg/min or more (ASTM D 1238, 230° C., 2.16 kg);
   e) a multimodal Mw/Mn (GPC-DRI); and
   f) more than 15 and less than 200 regio defects (defined to be the sum of 2,1-erythro and 2,1-threo insertions and 3,1-isomerizations) per 10,000 propylene units, as determined by $^{13}$C NMR.

In another aspect, the process further includes: adding a comonomer selected from ethylene and a $C_4$-$C_{40}$ olefin monomer to the polymerization after time period, B, for a time period, C; and obtaining a propylene polymer composition having:
   a) at least 50 mol % propylene;
   b) at least 1 mol % comonomer (preferably at least 3 mol %);
   c) a 1% secant flexural modulus of at least 1500 MPa;
   d) an Mw/Mn of at least 5;
   e) a melt flow rate of 50 dg/min or more;
   f) more than 15 and less than 200 regio defects per 10,000 propylene units; and
   g) a CDBI of 50% or more.

In a preferred embodiment of the invention, the catalyst system comprises an activator and a catalyst compound represented by the formula:

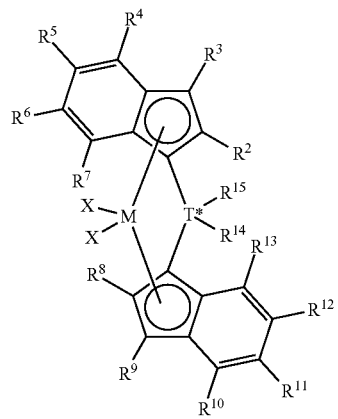

where:
M is a group 4 metal, preferably Hf or Zr;
T* is Si, Ge, or C;
$R^{14}$ and $R^{15}$ are $C_1$-$C_{10}$ alkyl and can form a cyclic group;
X is an anionic leaving group;
each $R^2$, $R^3$, $R^5$, $R^6$, $R^7$, $R^8$, $R^9$, $R^{11}$, $R^{12}$, and $R^{13}$ is independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR, —OSiR'$_3$ or
—PR'$_2$ radical, wherein R' is one of a halogen atom, a $C_1$-$C_{10}$ alkyl group, or a $C_6$-$C_{10}$ aryl group, provided that $R^2$ and $R^8$ may not be hydrogen; and
$R^4$ and $R^{10}$ are, independently, a substituted or unsubstituted aryl group.

The propylene polymer composition produced herein after time period C may be referred to herein as an impact copolymer, a propylene impact copolymer, an in-reactor propylene impact copolymer, or in-reactor propylene impact copolymer composition and such terms are used interchangeably herein.

The propylene polymer compositions of this invention may be prepared using conventional polymerization processes such as a two-stage process in two reactors or a three stage process in three reactors, although it is also possible to produce these compositions in a single reactor. Each stage may be independently carried out in either the gas solution or liquid slurry phase. For example, the first stage may be conducted in the gas phase and the second in liquid slurry or vice versa and the optional third stage in gas or slurry phase. Alternatively, each phase may be the same in the various stages. The propylene polymer compositions of this invention can be produced in multiple reactors, preferably two or three, operated in series, where Component A is preferably polymerized first in a gas phase, liquid slurry or solution polymerization process. Component B (the polymeric material produced in the presence of Component A) is preferably polymerized in a second reactor such as a gas phase or slurry phase reactor. In an alternative embodiment, Component A can be made in at least two reactors in order to obtain fractions with varying melt flow rates.

As used herein "stage" is defined as that portion of a polymerization process during which one component of the in-reactor composition, Component A or Component B (or component C, if a third stage is present), is produced. One or multiple reactors may be used during each stage. The same or different polymerization process may be used in each stage.

The stages of the processes of this invention can be carried out in any manner known in the art, in solution, in suspension or in the gas phase, continuously or batchwise, or any combination thereof, in one or more steps. Homogeneous polymerization processes are useful. (A homogeneous polymerization process is defined to be a process where at least 90 wt % of the product is soluble in the reaction media.) A bulk homogeneous process is also useful. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, a slurry process is used in one or more stages. As used herein the term "slurry polymerization process" means a polymerization process where a supported catalyst is employed and monomers are polymerized on the supported catalyst particles, and at least 95 wt % of polymer products derived from the supported catalyst are in granular form as solid particles (not dissolved in the diluent). Gas phase polymerization processes are particularly preferred and can be used in one or more stages.

In a preferred embodiment, Stage A produces homopolypropylene and stage B produces homopolypropylene. In a preferred embodiment, Stage A produces homopolypropylene, stage B produces homopolypropylene and Stage C produces propylene copolymer, such as propylene-ethylene copolymer.

If the polymerization is carried out as a suspension or solution polymerization, an inert solvent may be used, for example, the polymerization may be carried out in suitable diluents/solvents. Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4-10 alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents. It is also possible to use mineral spirit or a hydrogenated diesel oil fraction as a solvent. Toluene may also be used. The polymerization is preferably carried out in the liquid monomer(s). If inert solvents are used, the monomer(s) is (are) typically metered in gas or liquid form.

In a preferred embodiment, the feed concentration of the monomers and comonomers for the polymerization is 60 vol % solvent or less, preferably 40 vol % or less, or preferably 20 vol % or less, based on the total volume of the feedstream. Preferably, the polymerization is run in a bulk process.

Preferred polymerizations can be run at any temperature and/or pressure suitable to obtain the desired polymers. Typical temperatures and/or pressures in any stage include a temperature greater than 30° C., preferably greater than 50° C., preferably greater than 65° C., preferably greater than 70° C., preferably greater than 75° C., alternately less than 300° C., preferably less than 200° C., preferably less than 150° C., most preferred less than 140° C.; and/or at a pressure in the range of from 100 kPa to 20 MPa, about 0.35 MPa to about 10 MPa, preferably from about 0.45 MPa to about 6 MPa, or preferably from about 0.5 MPa to about 5 MPa.

In a typical polymerization in any stage, the run time of the reaction is up to 300 minutes, preferably in the range of from about 5 to 250 minutes, or preferably from about 10 to 120 minutes. In a preferred embodiment in a continuous process the polymerization time for all stages is from 1 to 600 minutes, preferably 5 to 300 minutes, preferably from about 10 to 120 minutes.

Hydrogen may be added to one, two or more reactors or reaction zones. Often hydrogen is added to control molecular weight and MFR. The overall pressure in the polymerization in each stage usually is at least about 0.5 bar, preferably at least about 2 bar, most preferred at least about 5 bar. Pressures higher than about 100 bar, e.g., higher than about 80 bar and, in particular, higher than about 64 bar are usually not preferred. In some embodiments, hydrogen is present in the polymerization reaction zone at a partial pressure of from 0.001 to 100 psig (0.007 to 690 kPa), preferably from 0.001 to 50 psig (0.007 to 345 kPa), preferably from 0.01 to 25 psig (0.07 to 172 kPa), more preferably 0.1 to 10 psig (0.7 to 70 kPa).

The processes described herein have the unique aspect of reverse hydrogen staging, e.g. hydrogen is introduced in the second stage in larger quantities than in the first stage. For example, the second stage polymerization occurs in the presence of at least 1 mmol of hydrogen per mol of propylene (preferably at least 5 mmol, preferably at least 10 mmol, preferably at least 15 mmol ppm, preferably at least 20 mmol, preferably at least 30 mmol, preferably at least 50 mmol ppm per mol of propylene) for a time period, B, where time period A, the polymerization prior to period B, is at least as long as (preferably at least 1.1 times, preferably at least 1.25, preferably at least 1.5 times, preferably at least 2 times, preferably at least 3 times, preferably at least 4 times, preferably at least 5 times, preferably at least 10 times) longer than time period B and the hydrogen concentration during time period B is at least three times (preferably 5 times, preferably 10 times, preferably 15 times) greater than the hydrogen concentration in time period A, to produce component B.

In a preferred embodiment of the invention, time period A is 1 to 4500 minutes, preferably 5 to 600 minutes, preferably 10 to 300 minutes. In a preferred embodiment of the invention, time period B is 1 to 1500 minutes, preferably 5 to 600 minutes, preferably 10 to 300 minutes.

In a preferred embodiment of the invention, the hydrogen concentration in stage A is 0 to 200 mmol of hydrogen per mol of propylene, preferably 1 to 100 mmol of hydrogen per mol of propylene, preferably 5 to 50 mmol of hydrogen per mol of propylene. In a preferred embodiment of the invention, the hydrogen concentration in stage B is 1 mmol to 200 mmol of hydrogen per mol of propylene (preferably 5 mmol to 150 mmol, preferably 10 to 100 mmol, preferably 15 mmol to 100 mmol, preferably 20 mmol to 100 mmol, preferably 30 mmol to 100 mmol, preferably 50 mmol to 100 mmol per mol of propylene).

In a preferred embodiment, propylene is combined with a catalyst system as described herein for a time period A, hydrogen is added for a time period B, and then comonomer is added for a time period, C. Hydrogen may or may not be present in stage C (if present the hydrogen is preferably present at 1 mmol to 200 mmol of hydrogen per mol of propylene, preferably 5 mmol to 150 mmol, preferably 10 to 100 mmol) and stage C may be from 1 to 3500 minutes long (preferably 1 to 4500 minutes, preferably 5 to 600 minutes, preferably 10 to 300 minutes).

Polymerization processes of this invention can be carried out in each of the stages in a batch, semi-batch, or continuous mode. If two or more reactors (or reaction zones) are used, preferably they are combined so as to form a continuous process. Preferred polymerizations can be run at any temperature and/or pressure suitable to obtain the desired polymers. In a preferred embodiment of the invention, the process to produce the propylene polymer composition is continuous.

In a preferred embodiment of the invention, in the first stage, A, propylene and from about 0 wt % to 15 wt % C2 and/or C4 to C20 alpha olefins (alternately 0.5 to 10 wt %, alternately 1 to 5 wt %), based upon the weight of the monomer/comonomer feeds (and optional H2), are contacted with the metallocene catalyst(s) described herein under polymerization conditions to form Component A. In the first stage, the monomers preferably comprise propylene and optional comonomers comprising one or more of ethylene and/or C4 to C20 olefins, preferably C4 to C16 olefins, or preferably C6 to C12 olefins. The C4 to C20 olefin monomers may be linear, branched, or cyclic. The C4 to C20 cyclic olefins may be strained or unstrained, monocyclic or polycyclic, and may optionally include heteroatoms and/or one or more functional groups. In a preferred embodiment, the monomer in stage A is propylene and no comonomer is present.

In a preferred embodiment of the invention, in the second stage, B, propylene and from about 0 wt % to 15 wt % C2 and/or C4 to C20 alpha olefins (alternately 0.5 to 10 wt %, alternately 1 to 5 wt %), based upon the weight of the monomer/comonomer feeds, are contacted with the metallocene catalyst(s) described herein under polymerization conditions to form Component B. In the second stage, the monomers preferably comprise propylene and optional comonomers comprising one or more of ethylene and/or C4 to C20 olefins, preferably C4 to C16 olefins, or preferably C6 to C12 olefins. The C4 to C20 olefin monomers may be linear, branched, or cyclic. The C4 to C20 cyclic olefins may be strained or unstrained, monocyclic or polycyclic, and may optionally include heteroatoms and/or one or more functional groups. In a preferred embodiment, the monomer in stage B is propylene and no comonomer is present.

In a preferred embodiment of the invention, in the optional third stage, the product from Stage B, and ethylene and from about 0 wt % to 50 wt % (preferably 3 wt % to 40 wt %, preferably 5 to 30 wt %), based upon the weight of the monomer/comonomer feeds, of one or more comonomers (such as C3 to C20 alpha olefins) are contacted in the presence of the metallocene catalyst system(s) described herein and optional hydrogen, under polymerization conditions to form Component C intimately mixed with Components A and B which preferably forms an impact copolymer. In the optional third stage, the monomers comprise ethylene and optional comonomers comprising one or more C3 to C20 olefins, preferably C4 to C16 olefins, or preferably C6 to C12 olefins. The C3 to C20 olefin monomers may be linear, branched, or cyclic. The C3 to C20 cyclic olefins may be strained or unstrained, monocyclic or polycyclic, and may optionally include heteroatoms and/or one or more functional groups.

Alternately, in the second stage, Component A, propylene and optionally from about 1 wt % to 15 wt % (preferably 3 wt % to 10 wt %), based upon the weight of the monomer/comonomer feeds, of one or more comonomers (such as ethylene or C4 to C20 alpha olefins) are contacted in the presence of the metallocene catalyst system(s) described herein and hydrogen, under polymerization conditions to form Component B intimately mixed with Component A which forms the propylene polymer composition. In the second stage, the optional comonomers may comprise one or more of ethylene and C3 to C20 olefins, preferably C4 to C16 olefins, or preferably C6 to C12 olefins. The C4 to C20 olefin monomers may be linear, branched, or cyclic. The C4 to C20 cyclic olefins may be strained or unstrained, monocyclic or polycyclic, and may optionally include heteroatoms and/or one or more functional groups.

Alternately, in the second stage, Component A and propylene are contacted in the presence of the metallocene catalyst system(s) described herein and hydrogen, under polymerization conditions to form Component B intimately mixed with Component A which forms the propylene polymer composition.

The catalyst systems used in the stages may be the same or different and are preferably the same. In a preferred embodiment of the invention, the catalyst system used in Stage A is transferred with the polymerizate (e.g. Component A) to Stage B, where it is contacted with additional monomer to form Component B, and thus the final propylene polymer composition. In other embodiments of the invention, catalyst is provided to one, two or all three reaction zones.

In a preferred embodiment of the invention, Stage A produces a homopolypropylene, stage B produces a homopolypropylene and Stage C produces a copolymer of ethylene-butene, ethylene-hexene, ethylene-octene, ethylene-propylene, ethylene-propylene-butene, ethylene-propylene-hexene, or ethylene-propylene-octene.

In an embodiment of the invention, little or no scavenger is used in the polymerization in any stage to produce the polymer, i.e. scavenger (such as trialkyl aluminum) is present at zero mol %, alternately the scavenger is present at a molar ratio of scavenger metal to transition metal of less than 100:1, preferably less than 50:1, preferably less than 15:1, preferably less than 10:1.

Other additives may also be used in the polymerization in any stage, as desired, such as one or more scavengers, promoters, modifiers, chain transfer agents (such as diethyl zinc), reducing agents, oxidizing agents, hydrogen, aluminum alkyls, or silanes.

In a preferred embodiment of the invention, the polymerization occurs in either stage in a supercritical or supersolution state as described in U.S. Pat. No. 7,812,104, incorporated by reference.

In an embodiment of the invention, the productivity of the catalyst system in a single stage or in all stages combined is at least 50 gpolymer/g (cat)/hour, preferably 500 or more gpolymer/g (cat)/hour, preferably 5000 or more gpolymer/g (cat)/hour, preferably 50,000 or more gpolymer/g (cat)/hour.

In an embodiment of the invention, the activity of the catalyst system in a single stage or in all stages combined is at least 50 kgP/molcat, preferably 500 or more kgP/molcat, preferably 5000 or more kgP/molcat, preferably 50,000 or more kgP/molcat.

In another embodiment of the invention, the conversion of olefin monomer is at least 10%, based upon polymer yield and the weight of the monomer entering the reaction zone, preferably 20% or more, preferably 30% or more, preferably 50% or more, preferably 80% or more. A "reaction zone", also referred to as a "polymerization zone," is a vessel where the polymerization process takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In preferred embodiments, the polymerization occurs in two, three, four or more reaction zones. In another embodiment of the invention, the conversion of olefin monomer is at least 10%, based upon polymer yield and the weight of the monomer entering all reaction zones, preferably 20% or more, preferably 30% or more, preferably 50% or more, preferably 80% or more.

Monomers

Monomers useful herein include substituted or unsubstituted C2 to C40 alpha olefins, preferably C2 to C20 alpha olefins, preferably C2 to C12 alpha olefins, preferably ethylene, propylene, butene, pentene, hexene, heptene, octene, nonene, decene, undecene, dodecene and isomers thereof. In a preferred embodiment, the monomer comprises propylene and optional comonomer(s) comprising one or more of ethylene or C4 to C40 olefins, preferably C4 to C20 olefins, or preferably C6 to C12 olefins. The C4 to C40 olefin monomers may be linear, branched, or cyclic. The C4 to C40 cyclic olefins may be strained or unstrained, monocyclic or polycyclic, and may optionally include heteroatoms and/or one or more functional groups. In a preferred embodiment of the invention, the monomer is propylene and no comonomer is present.

Exemplary C2 to C40 olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Preferably, the polymerization or copolymerization is carried out using olefins such as ethylene, propylene, 1-butene, 1-hexene, 4-methyl-1-pentene, and 1-octene, vinylcyclohexane, norbornene and norbornadiene. In particular, propylene and ethylene are polymerized.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, C4 raffinate streams, and can therefore be substantially less expensive than pure 1-butene.

In preferred embodiments, the monomers comprise 0 wt % diene monomer in any stage, preferably in all stages.

Preferably, the comonomer(s) are present in the final propylene polymer composition at less than 50 mol %, preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of the main monomer (e.g. propylene).

In a preferred embodiment of the invention, the polymer produced in stage A is isotactic polypropylene, preferably isotactic homopolypropylene and the polymer produced in stage B comprises propylene and from 0.5 to 50 mol % (preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of propylene) of ethylene or C4 to C20 alpha olefin, preferably ethylene and butene, hexene and or octene.

In a preferred embodiment of the invention, the polymer produced in stage A is isotactic polypropylene, preferably isotactic homopolypropylene, and the polymer produced in stage B is an isotactic polypropylene.

In a preferred embodiment of the invention, the polymer produced in stage A is isotactic polypropylene, preferably isotactic homopolypropylene, and the polymer produced in stage B is an isotactic polypropylene, and the polymer produced in stage C comprises propylene and from 0.5 to 50 mol % (preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of propylene) of ethylene and butene, or ethylene and hexene, or ethylene and octene.

Metallocene Catalyst Compounds

Metallocene catalyst compounds useful in the processes described herein include those catalyst compounds represented by the formula:

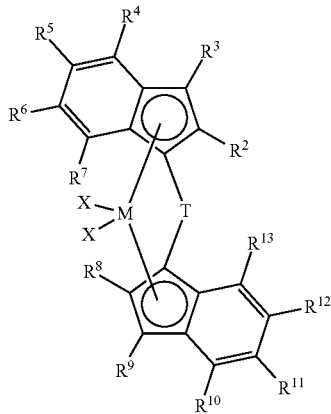

where:

M is a group 4 metal (preferably Hf, Ti, Zr, preferably Hf or Zr);

T is a bridging group;

X is an anionic leaving group;

each $R^2$, $R^3$, $R^5$, $R^6$, $R^7$, $R^8$, $R^9$, $R^{11}$, $R^{12}$, and $R^{13}$ is independently, halogen atom, hydrogen, a hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR, —OSiR'$_3$ or —PR'$_2$ radical, wherein R' is one of a halogen atom, a $C_1$-$C_{10}$ alkyl group, or a $C_6$-$C_{10}$ aryl group, provided that $R^2$ and $R^8$ may not be hydrogen; and $R^4$ and $R^{10}$ are, independently, a substituted or unsubstituted aryl group.

In a preferred embodiment of the invention, M is Hf or Zr; T is represented by the formula, (R*2G)g, where each G is C, Si, or Ge, g is 1 or 2, and each R* is, independently, hydrogen, halogen, C1 to C20 hydrocarbyl or a C1 to C20 substituted hydrocarbyl, and two or more R* can form a cyclic structure including aromatic, partially saturated, or saturated cyclic or fused ring system; X is an anionic leaving group; each R3, R5, R6, R7, R9, R11, R12, and R13 is independently, hydrogen, a hydrocarbyl, substituted hydrocarbyl, halocarbyl, substituted halocarbyl, silylcarbyl, substituted silylcarbyl, germylcarbyl, or substituted germylcarbyl substituents, provided that R2 and R8 are independently a C1 to C20 hydrocarbyl group; and R4 and R10 are, independently, a substituted or unsubstituted aryl, preferably a substituted or unsubstituted phenyl group.

In any embodiment of the invention in any embodiment of any formula described herein, M is Zr or Hf.

In any embodiment of the invention in any embodiment of any formula described herein, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and C1 to C5 alkyl groups, preferably each X is a methyl group.

In a preferred embodiment of the invention in any embodiment of any formula described herein, each R3, R5, R6, R7, R9, R11, R12, or R13 is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any formula described herein, each R3, R4, R5, R6, R7, R9, R10, R11, R12, or R13 is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In a preferred embodiment of the invention in any embodiment of any formula described herein, T is a bridging group and comprises Si, Ge, or C, preferably T is dialkyl silicon or dialkyl germanium, preferably T is dimethyl silicon.

In a preferred embodiment of the invention in any embodiment of any formula described herein, T is a bridging group and is represented by R'2C, R'2Si, R'2Ge, R'2CCR'2, R'2CCR'2CR'2, R'2CCR'2CR'2CR'2, R'C=CR', R'C=CR'CR'2, R'2CCR'=CR'CR'2, R'C=CR'CR'=CR', R'C=CR'CR'2CR'2, R'2CSiR'2, R'2SiSiR'2, R2CSiR'2CR'2, R'2SiCR'2SiR'2, R'C=CR'SiR'2, R'2CGeR'2, R'2GeGeR'2, R'2CGeR'2CR'2, R'2GeCR'2GeR'2, R'2SiGeR'2, R'C=CR'GeR'2, R'B, R'2C—BR', R'2C—BR'—CR'2, R'2C—O—CR'2, R'2CR'2C—O—CR'2CR'2, R'2C—O—CR'2CR'2, R'2C—O—CR'=CR', R'2C—S—CR'2, R'2CR'2C—S—CR'2CR'2, R'2C—S—CR'2CR'2, R'2C—S—CR'=CR', R'2C—Se—CR'2, R'2CR'2C—Se—CR'2CR'2, R'2C—Se—CR2CR'2, R'2C—Se—CR'=CR', R'2C—N=CR', R'2C—NR'—CR'2, R'2C—NR'—CR'2CR'2, R'2C—NR'—CW=CR', R'2CR'2C—NR'—CR'2CR'2, R'2C—P=CR', or R'2C—PR'—CR'2 where each R' is, independently, hydrogen or a C1 to C20 containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, T is CH2, CH2CH2, C(CH3)2, SiMe2, SiPh2, SiMePh, silylcyclobutyl (Si(CH2)3), (Ph)2C, (p-(Et)3SiPh)2C, cyclopentasilylene (Si(CH2)4), or Si(CH2)5.

In a preferred embodiment of the invention in any embodiment of any formula described herein, each R2 and R8, is independently, a C1 to C20 hydrocarbyl, or a C1 to C20 substituted hydrocarbyl, C1 to C20 halocarbyl, C1 to C20 substituted halocarbyl, C1 to C20 silylcarbyl, C1 to C20 substituted silylcarbyl, C1 to C20 germylcarbyl, or C1 to C20 substituted germylcarbyl substituents. Preferably, each R2 and R8, is independently, methyl, ethyl, propyl, butyl, pentyl, hexyl, heptyl, octyl, nonyl, decyl, undecyl, docedyl or an isomer thereof, preferably cyclopropyl, cyclohexyl, (1-cyclohexyl methyl)methyl, isopropyl, and the like.

In a preferred embodiment of the invention in any embodiment of any formula described herein, R4 and R10 are, independently, a substituted or unsubstituted aryl group.

Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom containing group.

Examples of aryl and substituted aryl groups include phenyl, naphthyl, anthraceneyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbozyl, naphthyl, and the like.

In a preferred embodiment of the invention in any embodiment of any formula described herein, R2 and R8 are a C1 to C20 hydrocarbyl, such as methyl, ethyl, propyl, butyl, pentyl, hexyl, heptyl, octyl, nonyl, decyl, undecyl, docedyl or an isomer thereof, preferably cyclopropyl, cyclohexyl, (1-cyclohexyl methyl)methyl, or isopropyl; and R4 and R10 are independently selected from phenyl, naphthyl, anthraceneyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, cyclopenta[b]thiopheneyl. In a preferred embodiment, R2, R8, R4 and R10 are as described in the preceding sentence and R3, R5, R6, R7, R9, R11, R12, and R13 are hydrogen.

Metallocene compounds that are particularly useful in this invention include one or more of:
dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl)hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl)zirconium dichloride; dimethylsilylene-(2-isopropyl-4(4-t-butyl)phenyl)indenyl) (2-methyl-4-phenyl indenyl)hafnium dichloride; dimethylsilylene-(2-isopropyl-4(4-t-butyl)phenyl)indenyl) (2-methyl, 4-t-butylindenyl)zirconium dichloride; dimethylsilylene-(2-isopropyl-4(4-t-butyl)phenyl)indenyl) (2-methyl, 4-t-butylindenyl)hafnium dichloride; dimethylsilylene-(2-isopropyl-4(4-t-butyl)phenyl)indenyl) (2-methyl-4-phenylindacenyl)zirconium dichloride; dimethylsilylene-(2-isopropyl-4(4-t-butyl)phenyl)indenyl) (2-methyl-4-phenylindacenyl)hafnium dichloride; dimethylsilylene (4-o-Biphenyl-2-(1-methylcyclohexyl)methyl-indenyl) (4-(3,5-di-tert-butylphenyl)-2-methyl-indenyl)zirconium dichloride; and dimethylsilylene (4-o-Biphenyl-2-(1-methylcyclohexyl)methyl- indenyl) (4-(3,5-di-tert-butylphenyl)-2-methyl-indenyl)hafnium dichloride;
where, in alternate embodiments, the dichloride in any of the compounds listed above may be replaced with dialkyl (such as dimethyl), dialkaryl, diflouride, diiodide, or dibromide, or a combination thereof.

In a preferred embodiment of the invention, at least 50 wt %, preferably at least 60 wt %, at least 70 wt %, preferably at least 80 wt %, at least 90 wt % of the catalyst compound is in the rac form, based upon the weight of the rac and meso forms present, preferably from 60 to 100 wt %, preferably from 80 to 100 wt %, preferably from 90 to 100 wt %. In a preferred embodiment of the invention, the molar ratio of rac to meso in the catalyst compound is from 1:1 to 100:1, preferably 5:1 to 90:1, preferably 7:1 to 80:1, preferably 5:1 or greater, or 7:1 or greater, or 20:1 or greater, or 30:1 or greater, or 50:1 or greater.

In an embodiment of the invention, the metallocene catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the invention, the bridged bis(indenyl)metallocene transition metal compound formed consists essentially of the racemic isomer.

Amounts of rac and meso isomers are determined by proton NMR. 1H NMR data are collected at 23° C. in a 5 mm probe using a 400 MHz Bruker spectrometer with deuterated methylene chloride. (Note that some of the examples herein use deuterated benzene, but for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

In a preferred embodiment in any of the processes described herein, one metallocene catalyst compound is used, e.g. the metallocene catalyst compounds are not different. For purposes of this invention one metallocene catalyst compound is considered different from another if they differ by at least one atom. For example, "bisindenyl zirconium dichloride" is different from (indenyl)(2-methylindenyl)zirconium dichloride" which is different from "(indenyl)(2-methylindenyl)hafnium dichloride." Metallocene catalyst compounds that differ only by isomer are considered the same for purposes of determining whether they are the "same", e.g., rac-dimethylsilylbis(2-methyl 4-phenyl)hafnium dimethyl is considered to be the same as meso-dimethylsilylbis(2-methyl 4-phenyl)hafnium dimethyl. In a preferred embodiment, the hafnium bis indenyl metallocene compound used herein is at least 90% rac isomer.

In some embodiments, two or more different metallocene catalyst compounds are present in the catalyst system used herein. In some embodiments, two or more different metallocene catalyst compounds are present in the reaction zone where the process(es) described herein occur. When two transition metal compound based catalysts are used in one reactor as a mixed catalyst system, the two transition metal compounds should be chosen such that the two are compatible. A simple screening method such as by 1H or 13C NMR, known to those of ordinary skill in the art, can be used to determine which transition metal compounds are compatible. It is preferable to use the same activator for the transition metal compounds, however, two different activators, such as two non-coordination anions, a non-coordinating anion activator and an alumoxane, or two different alumoxanes can be used in combination. If one or more weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Metallocene Compounds

Generally metallocenes are synthesized as shown below (Scheme 1) where (i) is a deprotonation via a metal salt of alkyl anion (e.g. nBuLi) to form an indenide. (ii) reaction of indenide with an appropriate bridging precursor (e.g. Me2SiCl2). (iii) reaction of the above product with AgOTf. (iv) reaction of the above triflate compound with another equivalent of indenide. (v) double deprotonation via an alkyl anion (e.g. nBuLi) to form a dianion (vi) reaction of the dianion with a metal halide (e.g. ZrCl4). The final products are obtained by recrystallization of the crude solids.

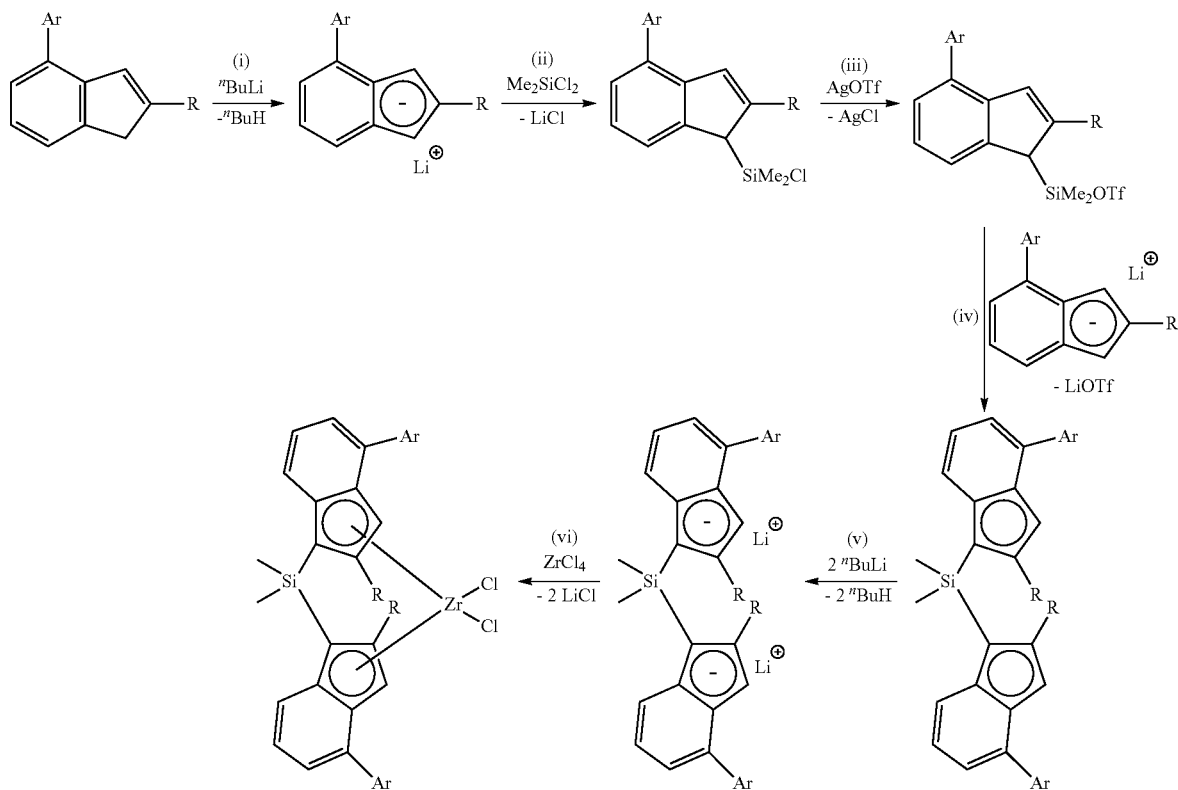

Scheme 1 transition metal compounds contain an X ligand which is not a hydride, hydrocarbyl, or substituted hydrocarbyl, then the alumoxane (or other alkylating agent) is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular Activators The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al(R1)-O— sub-units, where R1 is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277 003 A1, and EP 0 277 004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (1):

$$(Z)_d^+(A^{d-}) \quad (1)$$

wherein Z is (L-H) or a reducible Lewis Acid, L is an neutral Lewis base; H is hydrogen; (L-H)+ is a Bronsted acid; $A^{d-}$ is a non-coordinating anion having the charge d−; and d is an integer from 1 to 3.

When Z is (L-H) such that the cation component is (L-H)d+, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)d+ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: (Ar3C+), where Ar is aryl or aryl substituted with a heteroatom, a C1 to C40 hydrocarbyl, or a substituted C1 to C40 hydrocarbyl, preferably the reducible Lewis acid is represented by the formula: (Ph3C+), where Ph is phenyl or phenyl substituted with a heteroatom, a C1 to C40 hydrocarbyl, or a substituted C1 to C40 hydrocarbyl. In a preferred embodiment, the reducible Lewis acid is triphenyl carbenium.

The anion component Ad– includes those having the formula [Mk+Qn]d–, wherein k is 1, 2, or 3; n is 1, 2, 3, 4, 5, or 6, preferably 3, 4, 5 or 6; n–k=d; M is an element selected from Group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable Ad– components also include diboron compounds as disclosed in U.S. Pat. No. 5,447,895, which is fully incorporated herein by reference.

NCA activators represented by the formula (3) may also be used herein:

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 3 also comprises a suitable cation that is essentially non-interfering with the ionic catalyst complexes formed with the transition metal compounds, preferably the cation is $Z_d+$ as described above.

In a preferred embodiment in any of the NCA's comprising an anion represented by Formula 3 described above, R is selected from the group consisting of substituted or unsubstituted C1 to C30 hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C4 to C20 hydrocarbyl groups; —SR1, —NR22, and —PR32, where each R1, R2, or R3 is independently a substituted or unsubstituted hydrocarbyl as defined above; or a C1 to C30 hydrocarbyl substituted organometalloid.

In a preferred embodiment in any of the NCA's comprising an anion represented by Formula 3 described above, the NCA also comprises cation comprising a reducible Lewis acid represented by the formula: (Ar3C+), where Ar is aryl or aryl substituted with a heteroatom, a C1 to C40 hydrocarbyl, or a substituted C1 to C40 hydrocarbyl, preferably the reducible Lewis acid represented by the formula: (Ph3C+), where Ph is phenyl or phenyl substituted with a heteroatom, a C1 to C40 hydrocarbyl, or a substituted C1 to C40 hydrocarbyl.

In a preferred embodiment in any of the NCA's comprising an anion represented by Formula 3 described above, the NCA also comprises a cation represented by the formula, (L-H)d+, wherein L is an neutral Lewis base; H is hydrogen; (L-H) is a Bronsted acid; and d is 1, 2, or 3, preferably (L-H)d+ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (4):

wherein $OX^{e+}$ is a cationic oxidizing agent having a charge of e+; e is 1, 2, or 3; d is 1, 2 or 3; and $A^{d-}$ is a non-coordinating anion having the charge of d– (as further described above). Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, amidinate catalyst compounds described herein can be used with Bulky activators. A "Bulky activator" as used herein refers to anionic activators represented by the formula:

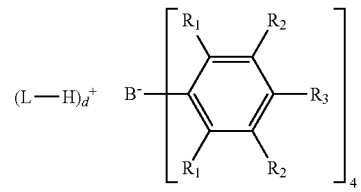

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—Ra, where $R_a$ is a $C_1$ to $C_{20}$ hydrocarbyl or hydrocarbylsilyl group (preferably $R_3$ is a fluoride or a $C_6$ perfluorinated aromatic hydrocarbyl group);
wherein $R_2$ and $R_3$ can form one or more saturated or unsaturated, substituted or unsubstituted rings (preferably $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3Vs, where Vs is the scaled volume. Vs is the sum of the relative volumes of the constituent atoms, and is calculated from the molecular formula of the substituent using the following table of relative volumes. For fused rings, the Vs is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | MV Per substituent (Å$^3$) | Total MV (Å$^3$) |
|---|---|---|
| Dimethylanilinium tetrakis(perfluoronaphthyl)borate | 261 | 1044 |
| Dimethylanilinium tetrakis(perfluorobiphenyl)borate | 349 | 1396 |
| [4-tButyl-PhNMe$_2$H] [(C$_6$F$_3$(C$_6$F$_5$)$_2$)$_4$$^B$] | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe2H][(C6F3(C6F5)2)4B], and the types disclosed in U.S. Pat. No. 7,297,653.

Illustrative, but not limiting, examples of boron compounds which may be used as an activator in the processes of this invention include N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph3C+][B(C6F5)4-], [Me3NH+][B(C6F5)4-]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In a particularly preferred embodiment, the activator used in combination with any catalyst compound(s) described herein is N,N-dimethylanilinium tetrakis(perfluoronaphthyl)borate.

In a preferred embodiment, any of the activators described herein may be mixed together before or after combination with the catalyst compound, preferably before being mixed with the catalyst compound.

In some embodiments, two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044, which discuss the use of an alumoxane in combination with an ionizing activator).

Optional Scavengers or Co-Activators

In addition to the activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species, such as diethyl zinc may be used.

Optional Support Materials

In embodiments herein, the catalyst system may comprise an inert support material. Preferably, the support material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include Al2O3, ZrO2, SiO2, and combinations thereof, more preferably SiO2, Al2O3, or SiO2/Al2O3.

It is preferred that the support material, most preferably an inorganic oxide, has a surface area in the range of from about 10 to about 700 m2/g, pore volume in the range of from about 0.1 to about 4.0 cc/g and average particle size in the range of from about 5 to about 500 μm. More preferably, the surface area of the support material is in the range of from about 50 to about 500 m2/g, pore volume of from about 0.5 to about 3.5 cc/g and average particle size of from about 10 to about 200 μm. Most preferably the surface area of the support material is in the range of from about 100 to about 400 m2/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m2/gm; pore volume of 1.65 cm3/gm). Preferred silicas are marketed under the tradenames of Davison 952 or Davison 955 by the Davison Chemical Division of W.R. Grace and Company. In other embodiments DAVISON 948 is used.

Polymer Products

The terms "polypropylene" and "propylene polymer" mean a polymer comprising at least 50 mol % propylene derived units. The term "polypropylene" is meant to encompass isotactic polypropylene (iPP) having at 10% or more isotactic pentads, highly isotactic polypropylene having 50% or more isotactic pentads, syndiotactic polypropylene (sPP) having at 10% or more syndiotactic pentads, homopolymer polypropylene (hPP, also called propylene homopolymer or homopolypropylene), and so-called random copolymer polypropylene (RCP, also called propylene random copolymer). Herein, an RCP is specifically defined to be a copolymer of propylene and 1 to 10 wt % of an olefin chosen from ethylene and C4 to C8 1-olefins. Preferably, the olefin comonomer in an RCP is ethylene or 1-butene, preferably ethylene. The term "EP Rubber" means a copolymer of ethylene and propylene, and optionally one or more diene monomer(s), where the ethylene content is from 35 to 85 mol %, the total diene content is 0 to 5 mol %, and the balance is propylene with a minimum propylene content of 15 mol %.

In any embodiment of the invention, the propylene polymer made in stage A is isotactic polypropylene or highly isotactic polypropylene, preferably homopolypropylene. In any embodiment of the invention, the propylene polymer made in stage B is isotactic polypropylene or highly isotactic polypropylene, preferably homopolypropylene. In an embodiment of the invention, the propylene polymer made in stage A is isotactic homopolypropylene or highly isotactic homopolypropylene. In an embodiment of the invention, the propylene polymer made in stage B is isotactic homopolypropylene or highly isotactic homopolypropylene. In a preferred embodiment, the propylene polymers made in stages A and B are both isotactic polypropylene, but are different in at least one physical characteristic, preferably the polymers differ in Mw, MFR, tacticity, comonomer content, Tm, Tc, Hf, or 1% Secant flexural modulus. In this context differ means that the polymers differ by more than 1% relative to each other, preferably by more than 5%, preferably by more than 10%, preferably by more than 15%, preferably by more than 20%, preferably by more than 30%, preferably by more than 40%, preferably by more than 50%, preferably by more than 100%, preferably by more than 200%.

In any embodiment of the invention, the propylene polymer compositions produced herein may have a multimodal molecular weight distribution (Mw/Mn) of polymer species as determined by GPC-DRI. By multimodal is meant that the GPC-DRI trace has more than one peak or inflection point. An inflection point is that point where the second derivative of the curve changes in sign (e.g., from negative to positive or vice versa). A bimodal molecular weight distribution (Mw/Mn) is one having two peaks or inflection points.

In any embodiment of the invention, the propylene polymer (the A component) advantageously has more than 15 and less than 200 regio defects (defined as the sum of 2,1-erythro and 2,1-threo insertions, and 3,1-isomerizations) per 10,000 propylene units, alternatively more than 17 and less than 175 regio defects per 10,000 propylene units, alternatively more than 20 or 30 or 40, but less than 200 regio defects, alternatively less than 150 regio defects per 10,000 propylene units. The regio defects are determined using 13C NMR spectroscopy as described below.

In any embodiment of the invention, the propylene polymer composition produced herein, particularly the composition produced after Stage A and Stage B (the combined A&B components), has more than 15 and less than 200 regio defects (defined as the sum of 2,1-erythro and 2,1-threo insertions, and 3,1-isomerizations) per 10,000 propylene units, alternatively more than 17 and less than 175 regio defects per 10,000 propylene units, alternatively more than 20 or 30 or 40, but less than 200 regio defects, alternatively less than 150 regio defects per 10,000 propylene units. The regio defects are determined using 13C NMR spectroscopy as described below.

In any embodiment of the invention, the propylene polymer (A) component can have a melting point (Tm, DSC peak second melt) of at least 145° C., or at least 150° C., or at least 152° C., or at least 155° C., or at least 160° C., or at least 165° C., preferably from about 145° C. to about 175° C., about 150° C. to about 170° C., about 152° C. to about 165° C.

In any embodiment of the invention, the propylene polymer compositions produced herein, particularly the composition produced after Stage A and Stage B (the combined A&B components), can have a melting point (Tm, DSC peak second melt) of at least 145° C., or at least 150° C., or at least 152° C., or at least 155° C., or at least 160° C., or at least 165° C., preferably from about 145° C. to about 175° C., about 150° C. to about 170° C., about 152° C. to about 165° C.

In any embodiment of the invention, the propylene polymer (A) component can have a 1% secant flexural modulus from a low of about 1100 MPa, about 1200 MPa, about 1250

MPa, about 1300 MPa, about 1400 MPa, or about 1,500 MPa to a high of about 1,800 MPa, about 2,100 MPa, about 2,600 MPa, or about 3,000 MPa, as measured according to ASTM D 790 (A, 1.0 mm/min), preferably from about 1100 MPa to about 2,200 MPa, about 1200 MPa to about 2,000 MPa, about 1400 MPa to about 2,000 MPa, or about 1500 MPa or more. 1% Secant flexural modulus is determined by using an ISO 37-Type 3 bar, with a crosshead speed of 1.0 mm/min and a support span of 30.0 mm via an Instron machine according to ASTM D 790(A, 1.0 mm/min).

In any embodiment of the invention, the propylene polymer compositions produced herein, particularly the composition produced after Stage A and Stage B (the combined A&B components), preferably have a 1% secant flexural modulus from about 1300 MPa to about 3,000 MPa, about 1500 MPa to about 3000 MPa, about 1800 MPa to about 2,500 MPa, or about 1800 MPa to about 2,000 MPa.

In any embodiment of the invention, the propylene polymer (A) component can have a melt flow rate (MFR, ASTM 1238, 230° C., 2.16 kg) from a low of about 0.1 dg/min, about 0.2 dg/min, about 0.5 dg/min, about 1 dg/min, about 15 dg/min, about 30 dg/min, or about 45 dg/min to a high of about 75 dg/min, about 100 dg/min, about 200 dg/min, or about 300 dg/min. For example, the polymer can have an MFR of about 0.5 dg/min to about 300 dg/min, about 1 dg/min to about 300 dg/min, about 5 dg/min to about 150 dg/min, or about 10 dg/min to about 100 dg/min, or about 20 dg/min to about 60 dg/min.

In any embodiment of the invention, the propylene polymer compositions produced herein, particularly the composition produced after Stage A and Stage B (the combined A&B components), can have an MFR (ASTM 1238, 230° C., 2.16 kg) of from about 1 dg/min to about 300 dg/min, about 5 dg/min to about 150 dg/min, or about 10 dg/min to about 100 dg/min, or about 20 dg/min to about 60 dg/min, preferably from about 50 to about 200 dg/min, preferably from about 55 to about 150 dg/min, preferably from about 60 to about 100 dg/min.

In any embodiment of the invention, the propylene polymer (A) component can have an Mw (as measured by GPC-DRI) from 50,000 to 1,000,000 g/mol, alternately from 80,000 to 1,000,000 g/mol, alternately from 100,000 to 800,000 g/mol, alternately from 200,000 to 600,000 g/mol, alternately from 300,000 to 550,000 g/mol, alternately from 330,000 g/mol to 500,000 g/mol.

In any embodiment of the invention, the propylene polymer compositions produced herein, particularly the composition produced after Stage A and Stage B (the combined A&B components), can have an Mw (as measured by GPC-DRI) from 50,000 to 1,000,000 g/mol, alternately from 80,000 to 1,000,000 g/mol, alternately from 100,000 to 800,000 g/mol, alternately from 200,000 to 600,000 g/mol, alternately from 300,000 to 550,000 g/mol, alternately from 330,000 g/mol to 500,000 g/mol.

In any embodiment of the invention, the propylene polymer (A) component can have an Mw/Mn (as measured by GPC-DRI) of greater than 1 to 20, preferably 1.1 to 15, preferably 1.2 to 10, preferably 1.3 to 5, preferably 1.4 to 4.

In any embodiment of the invention, the propylene polymer compositions produced herein, particularly the composition produced after Stage A and Stage B (the combined A&B components), can have an Mw/Mn (as measured by GPC-DRI) of greater than 5 to 50, preferably 5.5 to 45, preferably 6 to 40, preferably 6.5 to 35, preferably 7 to 30.

In any embodiment of the invention, the propylene polymer compositions produced herein, particularly the composition produced after Stage A and Stage B (the combined A&B components), can have a total propylene content of at least 75 wt %, at least 80 wt %, at least 85 wt %, at least 90 wt %, or at least 95 wt %, or 100 wt % based on the weight of the propylene polymer composition.

In any embodiment of the invention, the propylene polymer compositions produced herein, particularly the composition produced after Stage A and Stage B (the combined A&B components), can have a total comonomer content from about 1 wt % to about 35 wt %, about 2 wt % to about 30 wt %, about 3 wt % to about 25 wt %, or about 5 wt % to about 20 wt %, based on the total weight of the propylene polymer compositions, with the balance being propylene.

In any embodiment of the invention, the propylene polymer compositions produced herein, particularly the composition produced after Stage A and Stage B (the combined A&B components), can have a propylene meso diads content of 90% or more, 92% or more, about 94% or more, or about 96% or more. Polypropylene microstructure is determined according to the 13C NMR procedure described below.

In any embodiment of the invention, the propylene polymer compositions produced herein, particularly the composition produced after Stage A and Stage B (the combined A&B components), can have a melting point (Tm, DSC peak second melt) from at least 100° C. to about 175° C., about 105° C. to about 170° C., about 110° C. to about 165° C., or about 115° C. to about 155° C.

In any embodiment of the invention, the propylene polymer compositions produced herein, particularly the composition produced after Stage A and Stage B (the combined A&B components), can have a crystallization point (Tc, DSC) of 115° C. or more, preferably from at least 100° C. to about 150° C., about 105° C. to about 130° C., about 110° C. to about 125° C., or about 115° C. to about 125° C.

In any embodiment of the invention, the propylene polymer compositions produced herein, particularly the composition produced after Stage A and Stage B (the combined A&B components), can have a CDBI of 50% or more (preferably 60% or more, alternately 70% or more, alternately 80% or more, alternately 90% or more, alternately 95% or more).

In any embodiment of the invention, the propylene polymer compositions produced herein, particularly the composition produced after Stage A and Stage B (the combined A&B components), can have a multimodal (such as bimodal) molecular weight distribution (Mw/Mn) distribution of polymer species.

In a preferred embodiment, the propylene polymer composition produced herein has:

a) at least 50 mol % propylene (preferably from 50 to 100 mol %, preferably from 60 to 97 mol %, preferably from 65 to 95 mol %, preferably from 70 to 90 mol %, preferably at least 90 mol %, from 50 to 99 mol %) and optionally at least 1 mol % comonomer (preferably from 1 to 50 mol %, preferably from 3 to 40 mol %, preferably from 5 to 35 mol %, preferably from 10 to 30 mol %) based upon the weight of the propylene polymer composition;

b) a 1% secant flexural modulus of at least 1500 MPa (preferably at least 1600 MPa, preferably at least 1800 MPa);

c) an Mw/Mn of at least 5, as determined GPC-DRI (preferably from 5 to 40, preferably from 6 to 20, preferably from 7 to 15);

d) a melt flow rate of 50 dg/min or more, as determined by ASTM D 1238, 230° C., 2.16 kg (preferably 60 dg/min or more, preferably 75 dg/min or more);

e) a multimodal Mw/Mn, as determined by GPC-DRI;

f) more than 15 and less than 200 regio defects (sum of 2,1-erythro and 2,1-threo insertions and 3,1-isomerizations) per 10,000 propylene units, as determined by $^{13}$C NMR spectroscopy (preferably from 17 to 175 regio defects per 10,000 propylene units, alternatively more than 20 or 30 or 40, but less than 200 regio defects, alternatively less than 150 regio defects per 10,000 propylene units.); and, optionally,
g) if comonomer is present, a CDBI of 50% or more (preferably 60% or more, alternately 70% or more, alternately 80% or more, alternately 90% or more, alternately 95% or more).

In any embodiment described herein, propylene copolymer composition may have a melting point (Tm, DSC peak second melt) from at least 100° C. to about 175° C., about 105° C. to about 170° C., about 110° C. to about 165° C., or about 115° C. to about 155° C., and a crystallization point (Tc, DSC peak second melt) of 115° C. or more, preferably from at least 100° C. to about 150° C., about 105° C. to about 130° C., about 110° C. to about 125° C., or about 115° C. to about 125° C.

In any embodiment described herein, the propylene homo- or co-polymer produced by the process described herein has a Rabinowitch corrected shear viscosity ("RCSV") ratio (1 sec-1 to 2000 sec-1) of Y or more where Y=38000X−1.559, and X is the melt flow rate in dg/min of the propylene polymer, preferably Y=45000X−1.559, preferably Y=50524X−1.559. Shear viscosity is determined by capillary rheology on an ARC 2 rheometer at 190° C. using a 1 mm die with a path length of 30 mm according to ASTM D3835. Rabinowitch correction is performed as described at B. Rabinowitsch, Z. Physik. Chem., A 145, 1 (1929) using software program LAB KARS Advanced Rheology Software version 3.92 available from Alpha Technologies Services, Akron, Ohio.

In a preferred embodiment, the propylene polymer composition produced herein has:
a) at least 50 mol % propylene (preferably from 50 to 100 mol %, preferably from 60 to 97 mol %, preferably from 65 to 95 mol %, preferably from 70 to 90 mol %, preferably at least 90 mol %, from 50 to 99 mol %) and optionally at least 1 mol % comonomer (preferably from 1 to 50 mol %, preferably from 3 to 40 mol %, preferably from 5 to 35 mol %, preferably from 10 to 30 mol %) based upon the weight of the propylene polymer composition;
b) a 1% secant flexural modulus of at least 1500 MPa (preferably at least 1600 MPa, preferably at least 1800 MPa);
c) an Mw/Mn of at least 5, as determined GPC-DRI (preferably from 5 to 40, preferably from 6 to 20, preferably from 7 to 15);
d) a melt flow rate of 50 dg/min or more, as determined by ASTM D 1238, 230° C., 2.16 kg (preferably 60 dg/min or more, preferably 75 dg/min or more);
e) a multimodal Mw/Mn, as determined by GPC-DRI;
f) more than 15 and less than 200 regio defects (sum of 2,1-erythro and 2,1-threo insertions and 3,1-isomerizations) per 10,000 propylene units, as determined by $^{13}$C NMR spectroscopy (preferably from 17 to 175 regio defects per 10,000 propylene units, alternatively more than 20 or 30 or 40, but less than 200 regio defects, alternatively less than 150 regio defects per 10,000 propylene units);
g) if comonomer is present, a CDBI of 50% or more (preferably 60% or more, alternately 70% or more, alternately 80% or more, alternately 90% or more, alternately 95% or more); and h) an RCSV ratio (1 sec$^{-1}$ to 2000 sec$^{-1}$) of Y or more where Y=38000X$^{-1.559}$, and X is the melt flow rate in dg/min of the propylene polymer (preferably Y=45000X$^{-1.559}$, preferably Y=50524X$^{-1.559}$).

In another embodiment, this invention relates to, an in-situ propylene polymer comprising at least 50 mole % propylene, said in-situ propylene polymer composition having a 1% secant flexural modulus of at least 1500 MPa, an Mw/Mn of at least 5, a multimodal Mw/Mn as determined by GPC-DRI, a melt flow rate of 50 dg/min or more, and an RCSV ratio (1 sec-1 to 2000 sec-1) of Y or more where Y=38000X−1.559, and X is the melt flow rate in dg/min of the propylene polymer, preferably Y=45000X−1.559, preferably Y=50524X−1.559.

In another embodiment, the propylene polymer composition produced after time period B has a 1% secant flexural modulus at least 150 MPa greater than the polymer produced after time period A (preferably at least 200 MPa greater).

Impact Copolymer

A "polypropylene impact copolymer" (herein simply referred to as an "impact copolymer" (ICP)) is a blend typically comprising 60 to 95 wt % of (Component A plus or minus Component B) isotactic PP (typically with a Tm of 120° C. or more), and 5 to 40 wt % of (C) propylene polymer (often a copolymer) typically with a Tg of −30° C. or less, ethylene copolymer typically with a Tg of −30° C. or less or an EP Rubber. The morphology of an ICP is typically such that the matrix phase is comprised primarily of component (A) while the dispersed phase is comprised primarily of component (C) or is co-continuous. Typically, the ICP comprises only two monomers: propylene and a single comonomer chosen from among ethylene and C4 to C8 alpha-olefins (preferably ethylene, butene, hexene or octene, preferably ethylene). Alternately, the ICP comprises three monomers: propylene and two comonomers chosen from among ethylene and C4 to C8 alpha-olefins (preferably ethylene, butene, hexene and octene). Preferably, the (A) component has a Tm of 120° C. or more (preferably 130° C. or more, preferably 140° C. or more, preferably 150° C. or more, preferably 160° C. or more). Preferably, the (C) component is an amorphous polymer such as a propylene polymer or EP Rubber. Preferably, the (C) component has a Tg of −30° C. or less (preferably −40° C. or less, preferably −50° C. or less).

In an embodiment of the invention, the (C) component has a heat of fusion (Hf) of 90° C. or less (as determined by DSC). Preferably the (C) component has an Hf of 70° C. or less, preferably 50° C. or less, preferably 35° C. or less.

In an embodiment of the invention, the propylene polymer made in stage A has a propylene tacticity index of greater than 4 (preferably 4-6), the polypropylene made in stage B has a propylene tacticity index of greater than 4 (preferably 4-6), and the final impact copolymer (the combination of A, B and C) has an mm triad tacticity index of 75% or more preferably 80% or more, preferably 85% or more. In an embodiment of the invention, the propylene polymer made in stage A is isotactic polypropylene or highly isotactic polypropylene, preferably homopolypropylene. In an embodiment of the invention, the propylene polymer made in stage B is isotactic polypropylene or highly isotactic polypropylene, preferably homopolypropylene. In an embodiment of the invention, the propylene polymer made in stage C is atactic.

Preferably the ICP produced from Stages A, B and C is heterophasic. The term "hetero-phase" refers to the presence of two or more morphological phases in a blend of two or more polymers, where each phase comprises a different ratio of the polymers as a result of partial or complete immiscibility (i.e., thermodynamic incompatibility). A common example is a morphology consisting of a "matrix" (continuous) phase and at least one "dispersed" (discontinuous) phase. The dispersed phase takes the form of discrete domains (particles) distributed within the matrix (or within other phase domains, if there are more than two phases). Another example is a co-continuous morphology, where two phases are observed but it is unclear which is the continuous phase and which is the discontinuous phase. The presence of multiple phases is determined using microscopy techniques, e.g., optical microscopy, scanning electron microscopy (SEM), or atomic force microscopy (AFM); or by the presence of two glass transition peaks in a dynamic mechanical analysis (DMA) experiment; in the event of disagreement among these methods, the AFM determination shall be used.

In a preferred embodiment, the impact copolymer has a matrix phase comprising primarily a propylene polymer composition having a melting point (Tm) of 100° C. or more, an MWD of 5 of more and a multimodal MWD, and the dispersed phase comprises primarily a polyolefin having a glass transition temperature (Tg) of –20° C. or less. Preferably, the matrix phase comprises primarily homopolymer polypropylene (hPP) and/or random copolymer polypropylene (RCP) with relatively low comonomer content (less than 5 wt %), and has a melting point of 110° C. or more (preferably 120° C. or more, preferably 130° C. or more, preferably 140° C. or more, preferably 150° C. or more, preferably 160° C. or more). Preferably, the dispersed phase comprises primarily one or more ethylene or propylene copolymer(s) with relatively high comonomer content (at least 5 wt %, preferably at least 10 wt %); and has a Tg of –30° C. or less (preferably –40° C. or less, preferably –50° C. or less).

An "in-situ ICP" is a specific type of ICP which is a reactor blend of the (A&B) and (C) components of an ICP, meaning (A), (B) and (C) were made in separate reactors (or reactions zones) physically connected in series, with the effect that an intimately mixed final product is obtained in the product exiting the final reactor (or reaction zone). Typically, the components are produced in a sequential polymerization process, wherein (A) is produced in a first reactor is transferred to a second reactor where (B) is produced in a second reactor, and the product is transferred to a third reactor where (C) is produced and incorporated as domains into the (A&B) matrix. There may also be a minor amount of a third component (D), produced as a byproduct during this process, comprising primarily the non-propylene comonomer (e.g., (D) will be an ethylene polymer if ethylene is used as the comonomer). In the literature, especially in the patent literature, an in-situ ICP is sometimes identified as "reactor-blend ICP" or a "block copolymer", although the latter term is not strictly accurate since there is at best only a very small fraction of molecules that are (A)-(C) copolymers. In a preferred embodiment of the invention, the polymer composition produced herein is an in-situ-ICP.

An "ex-situ ICP" is a specific type of ICP which is a physical blend of (A&B) and (C), meaning (A&B) and (C) were synthesized independently and then subsequently blended typically using a melt-mixing process, such as an extruder. An ex-situ ICP is distinguished by the fact that (A&B) and (C) are collected in solid form after exiting their respective synthesis processes, and then combined; whereas for an in-situ ICP, (A) (B) and (C) are combined within a common synthesis process and only the blend is collected in solid form.

In one or more embodiments, the impact copolymer (the combination of A, B and C components) advantageously has more than 15 and less than 200 regio defects (defined as the sum of 2,1-erythro and 2,1-threo insertions, and 3,1-isomerizations) per 10,000 propylene units, alternatively more than 17 and less than 175 regio defects per 10,000 propylene units, alternatively more than 20 or 30 or 40, but less than 200 regio defects, alternatively less than 150 regio defects per 10,000 propylene units. The regio defects are determined using 13C NMR spectroscopy as described below.

The impact polymers produced after stage C, typically have a heterophasic morphology such that the matrix phase is primarily propylene polymer having a Tm of 120° C. or more and the dispersed phase is primarily an ethylene copolymer (such as EP Rubber) or propylene polymer typically having a Tg of –30° C. or less.

The impact copolymers produced herein preferably have a total propylene content of at least 75 wt %, at least 80 wt %, at least 85 wt %, at least 90 wt %, or at least 95 wt %, or 100 wt % based on the weight of the propylene polymer composition.

The impact copolymers produced herein preferably have a total comonomer content from about 1 wt % to about 35 wt %, about 2 wt % to about 30 wt %, about 3 wt % to about 25 wt %, or about 5 wt % to about 20 wt %, based on the total weight of the propylene polymer compositions, with the balance being propylene.

Preferred impact copolymers comprise isotactic polypropylene (typically from Stage A and B) and ethylene copolymer (typically from Stage C) and typically have an ethylene copolymer (preferably ethylene propylene copolymer, preferably EP Rubber) content from a low of about 5 wt %, about 8 wt %, about 10 wt %, or about 15 wt % to a high of about 25 wt %, about 30 wt %, about 38 wt %, or about 42 wt %. For example, the impact polymer can have an ethylene copolymer content of about 5 wt % to about 40 wt %, about 6 wt % to about 35 wt %, about 7 wt % to about 30 wt %, or about 8 wt % to about 30 wt %.

In preferred impact copolymers comprising isotactic polypropylene (from stage A and B) and ethylene copolymer (from Stage C), the impact copolymer can have a propylene content of the ethylene copolymer component from a low of about 25 wt %, about 37 wt %, or about 46 wt % to a high of about 73 wt %, about 77 wt %, or about 80 wt %, based on the weight of the ethylene copolymer. For example, the impact copolymer can have a propylene content of the ethylene copolymer component from about 25 wt % to about 80 wt %, about 10 wt % to about 75 wt %, about 35 wt % to about 70 wt %, or at least 40 wt % to about 80 wt %, based on the weight of the ethylene copolymer.

The impact copolymers produced herein preferably have a heat of fusion (Hf, DSC second heat) of 60 J/g or more, 70 J/g or more, 80 J/g or more, 90 J/g or more, about 95 J/g or more, or about 100 J/g or more.

The impact polymers produced herein preferably have a 1% secant flexural modulus from about 300 MPa to about 3,000 MPa, about 500 MPa to about 2,500 MPa, about 700 MPa to about 2,000 MPa, or about 900 MPa to about 2,000 MPa, as measured according to ASTM D 790 (A, 1.0 mm/min).

The impact polymers, produced herein preferably have an Mw (as measured by GPC-DRI) from 50,000 to 1,000,000 g/mol, alternately from 80,000 to 1,000,000 g/mol, alternately 100,000 to 800,000 g/mol, alternately 200,000 to 600,000 g/mol, alternately from 300,000 to 550,000 g/mol, alternately from 330,000 g/mol to 500,000 g/mol.

$^{13}$C-NMR Spectroscopy on Polyolefins

Polypropylene microstructure is determined by 13C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d2-1,1,2,2-tetrachloroethane at 120° C., and spectra are acquired with a 10-mm broadband probe recorded at 120° C. using a 400 MHz (or higher) NMR spectrometer (such as Varian Inova 700 or Unity Plus 400, in event of conflict the 700 shall be used). Polymer resonance peaks are referenced to mmmm=21.83 ppm. Calculations involved in the characterization of polymers by NMR are described by F. A. Bovey in Polymer Conformation and Configuration (Academic Press, New York 1969) and J. Randall in Polymer Sequence Determination, 13C-NMR Method (Academic Press, New York, 1977).

The "propylene tacticity index", expressed herein as [m/r], is calculated as defined in H. N. Cheng, Macromolecules, 17, p. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic.

The "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$\text{mm Fraction} = \frac{PPP(\text{mm})}{PPP(\text{mm}) + PPP(\text{mr}) + PPP(\text{rr})}$$

where PPP(mm), PPP(mr) and PPP(a) denote peak areas derived from the methyl groups of the second units in the possible triad configurations for three head-to-tail propylene units, shown below in Fischer projection diagrams:

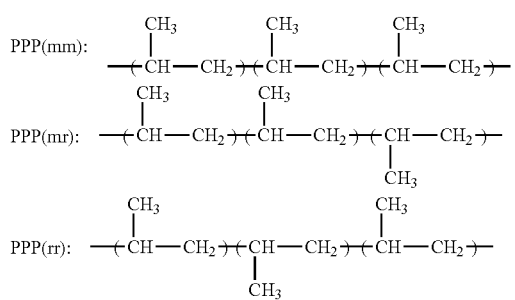

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a 13C-NMR spectrum, see 1) J. A. Ewen, Catalytic Polymerization of Olefins: Proceedings of the International Symposium on Future Aspects of Olefin Polymerization, T. Keii and K. Soga, Eds. (Elsevier, 1986), pp. 271-292; and 2) U.S. Patent Application US2004/054086 (paragraphs [0043] to [0054]).

An "isotactic" polymer has at least 10% isotactic pentads, a "highly isotactic" polymer has at least 50% isotactic pentads, and a "syndiotactic" polymer has at least 10% syndiotactic pentads, according to analysis by 13C-NMR. Preferably isotactic polymers have at least 20% (preferably at least 30%, preferably at least 40%) isotactic pentads. A polyolefin is "atactic," also referred to as amorphous" if it has less than 10% isotactic pentads and syndiotactic pentads.

Regio Defect Concentrations by $^{13}$C NMR

13Carbon NMR spectroscopy is used to measure stereo and regio defect concentrations in the polypropylene. 13Carbon NMR spectra are acquired with a 10-mm broadband probe on a Varian Inova 700 or UnityPlus 400 spectrometer (in event of conflict the 700 shall be used). The samples were prepared in 1,1,2,2-tetrachloroethane-d2 (TCE). Sample preparation (polymer dissolution) was performed at 120° C. In order to optimize chemical shift resolution, the samples were prepared without chromium acetylacetonate relaxation agent. Signal-to-noise was enhanced by acquiring the spectra with nuclear Overhauser enhancement for 10 seconds before the acquisition pulse, and 3.2 second acquisition period, for an aggregate pulse repetition delay of 14 seconds. Free induction decays of 3400-4400 coadded transients were acquired at a temperature of 120° C. After Fourier transformation (256 K points and 0.3 Hz exponential line broadening), the spectrum is referenced by setting the dominant mmmm meso methyl resonance to 21.83 ppm.

Chemical shift assignments for the stereo defects (given as stereo pentads) can be found in the literature [L. Resconi, L. Cavallo, A. Fait, and F. Piemontesi, Chem. Rev. 2000, 100, pp. 1253-1345]. The stereo pentads (e.g. mmmm, mmmr, mrrm, etc.) can be summed appropriately to give a stereo triad distribution (mm, mr, and rr), and the mole percentage of stereo diads (m and r). Three types of regio defects were quantified: 2,1-erythro, 2,1-threo, and 3,1-isomerization. The structures and peak assignments for these are also given in the reference by Resconi. The concentrations for all defects are quoted in terms of defects per 10,000 monomer units.

The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| regio defect | Chemical shift range (ppm) |
| --- | --- |
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals (CH3, CH, CH2), and multiplied by 10,000 to determine the defect concentration per 10,000 monomer units.

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, J. Appl. Polym. Sci., 56, p. 1781 (1995), and using peak assignments from Zhang, Polymer, 45, p. 2651 (2004) for higher olefin comonomers.

Composition Distribution Breadth index (CDBI) is a measure of the composition distribution of monomer within the polymer chains. It is measured as described in WO 93/03093, with the modification that any fractions having a weight-average molecular weight (Mw) below 20,000 g/mol are ignored in the calculation.

In another embodiment, this invention relates to:
1. A process to polymerize propylene comprising:
1) contacting propylene, optionally with a comonomer, with a catalyst system comprising an activator and a catalyst compound represented by the formula:

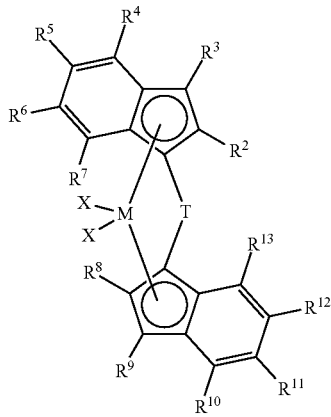

where:
M is a group 4 metal (preferably Hf or Zr);
T is a bridging group (preferably dialkylsilyl, such as dimethylsilyl);
X is an anionic leaving group (such as a halogen or hydrocarbyl, such as Cl or Me);
each $R^3$, $R^5$, $R^6$, $R^7$, $R^9$, $R^{11}$, $R^{12}$, and $R^{13}$ is independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —$NR'_2$, —$SR'$, —$OR$, —$OSiR'_3$ or —$PR'_2$ radical, wherein R' is one of a halogen atom, a $C_1$-$C_{10}$ alkyl group, or a $C_6$-$C_{10}$ aryl group; each $R^2$ and $R^8$ is independently, a hydrocarbyl, substituted hydrocarbyl, halocarbyl, substituted halocarbyl, silylcarbyl, substituted silylcarbyl, germylcarbyl, or substituted germylcarbyl substituents;
$R^4$ and $R^{10}$ are, independently, a substituted or unsubstituted aryl group (preferably substituted or unsubstituted phenyl group);
2) polymerizing the propylene and optional comonomer for a time period, A;
3) adding hydrogen or other chain termination agent and optional comonomer to the polymerization after time period A;
4) polymerizing in the presence of at least 1 mmol hydrogen per mol of propylene for a time period, B, where time period A is at least as long as time period B and the hydrogen concentration during time period B is at least three times greater than the hydrogen concentration in time period A (preferably the time period A is at least 1.5 times longer than time period B); and
5) obtaining a propylene polymer composition having:
  a) at least 50 mol % propylene;
  b) a 1% secant flexural modulus of at least 1500 MPa;
  c) an Mw/Mn of at least 5;
  d) a melt flow rate of 50 dg/min or more (230° C., 2.16 kg);
  e) a multimodal Mw/Mn; and
  f) more than 15 and less than 200 regio defects (sum of 2,1-erythro and 2,1-threo insertions and 3,1-isomerizations) per 10,000 propylene units.

2. The process of any of paragraphs 1 through 4, wherein the propylene polymer composition contains at least 70 mol % propylene, alternately at least 80 mol % propylene, alternately about 100% propylene.
3. The process of any of paragraphs 1 through 2, wherein the melt flow rate of the propylene polymer composition is from about 50 to about 200 dg/min; and wherein the propylene polymer composition produced is isotactic and/or has an mm triad tacticity index of about 75% or greater.
4. The process of any of paragraphs 1 through 3, wherein $R^2$ and $R^8$ are, independently, methyl, ethyl, propyl, butyl, pentyl, hexyl, octyl, nonyl, decyl, undecyl, dodecyl, or isomers of mixtures thereof, preferably $R^2$ and $R^8$ are cyclopropyl or methyl; and $R^4$ and $R^{10}$ are, independently, an aryl group, substituted with another group at the ortho position, preferably the phenyl groups are substituted at the ortho position with aryl groups or by linker groups, wherein the linker groups are an alkyl, vinyl, phenyl, alkynyl, silyl, germyl, amine, ammonium, phosphine, phosphonium, ether, thioether, borane, borate, alane or aluminate groups, preferably $R^4$ and $R^{10}$ are both biphenyl groups.
5. The process of any of paragraphs 1 through 4, wherein the polymerizations of time period A and time period B occur in the same reaction zone or different reaction zones.
6. The process of any of paragraphs 1 through 5, wherein the activator comprises an alumoxane and or a non-coordinating anion activator.
7. The process of any of paragraphs 1 through 6, wherein the catalyst is supported, preferably on silica.
8. The process of any of paragraphs 1 through 7, wherein the process is a slurry process or a homogeneous process or a gas phase process.
9. The process of any of paragraphs 1 through 8, wherein $R^2$ is a hydrocarbyl, substituted hydrocarbyl, halocarbyl, substituted halocarbyl, silylcarbyl, substituted silylcarbyl, germylcarbyl, or substituted germylcarbyl substituent;
$R^4$ is an aryl group substituted at the ortho position with another aryl group or by a linker group, wherein the linker group is an alkyl, vinyl, phenyl, alkynyl, silyl, germyl, amine, ammonium, phosphine, phosphonium, ether, thioether, borane, borate, alane or aluminate groups;
$R^8$ is a halogen atom, a $C_1$-$C_{10}$ alkyl group which may be halogenated, a $C_6$-$C_{10}$ aryl group which may be halogenated, a $C_2$-$C_{10}$ alkenyl group, a $C_7$-$C_{40}$-arylalkyl group, a $C_7$-$C_{40}$ alkylaryl group, a $C_8$-$C_{40}$ arylalkenyl group, a —$NR'_2$, —$SR'$, —$OR'$, —$OSiR'_3$ or —$PR'_2$ radical, wherein R' is one of a halogen atom, a $C_1$-$C_{10}$ alkyl group, or a $C_6$-$C_{10}$ aryl group; and
$R^{10}$ is phenyl group substituted at the 3' and 5' positions, independently, with a $C_1$-$C_{10}$ alkyl group.
10. A process to produce a propylene impact copolymer comprising: performing steps 1 to 4 in any of paragraphs 1 to 9 and thereafter
5) adding comonomer comprising ethylene and/or a $C_4$-$C_{40}$ olefin monomer to the polymerization after time period B for a time period, C; and
6) obtaining a propylene polymer composition having:
  a) at least 50 mol % propylene and at least 1 mol % comonomer;
  b) a 1% secant flexural modulus of at least 1500 MPa;
  c) an Mw/Mn of at least 5;
  d) a melt flow rate of 50 dg/min or more (230° C., 2.16 kg);
  e) a multimodal Mw/Mn;
  f) more than 15 and less than 200 regio defects (sum of 2,1-erythro and 2,1-threo insertions and 3,1-isomerizations) per 10,000 propylene units; and
  g) a CDBI of 50% or more.

11. The process of paragraph 10, where the comonomer added to the polymerization after time period A is selected from ethylene and a $C_4$-$C_{40}$ olefin monomers.

12. The process of any of the above paragraphs, where the polymer composition obtained comprises at least 50 mole % propylene and at least 1 mol % comonomer, and has a CDBI of 50% or more, a 1% secant flexural modulus of at least 1500 MPa, an Mw/Mn of at least 5, and a melt flow rate of 50 dg/min or more; and optionally has more than 15 and less than 100 regio defects per 10,000 propylene units.

13. The process of any of the above paragraphs, where the polymer composition obtained has a multimodal Mw/Mn as determined by GPC-DRI.

14. The process of any of the above paragraphs 1 to 11, where the polymer composition obtained comprises at least 50 mole % propylene, said propylene polymer composition having a 1% secant flexural modulus of at least 1500 MPa, an Mw/Mn of at least 5, a multimodal Mw/Mn as determined by GPC-DRI, a melt flow rate of 50 dg/min or more, and an RCSV ratio (1 $sec^{-1}$ to 2000 $sec^{-1}$) of Y or more, where $Y=38000X^{-1.559}$, and X is the melt flow rate in dg/min of the propylene polymer.

15. The process of any of the above paragraphs 1 to 13, wherein the propylene polymer composition has an RCSV ratio (1 $sec^{-1}$ to 2000 $sec^{-1}$) of Y or more, where $Y=38000X^{-1.559}$, and X is the melt flow rate in dg/min of the propylene polymer.

16. A propylene polymer having a melt flow ratio or 50 dg/min or more and an RCSV ratio (1 $sec^{-1}$ to 2000 $sec^{-1}$) of Y or more, where $Y=38000X^{-1.559}$, and X is the melt flow rate in dg/min of the propylene polymer.

17. An injection molded article comprising the in-situ propylene polymer of paragraph 16, or produced by the process of any of paragraphs 1-15, where the in-situ polymer has a 1% secant flexural modulus of at least 1600 MPa.

18. An injection molded article comprising the propylene polymer composition produced by the process of any of paragraphs 1-15, where the propylene polymer composition has a 1% secant flexural modulus at least 150 MPa greater than the polymer produced after time period A (preferably at least 200 MPa greater).

EXPERIMENTAL

Synthesis

Dimethylsilyl bis(2-cyclopropyl-4-(3,5-di-tert-butyl-phenyl)-indenyl)zirconium dichloride Indene Synthesis Scheme 2

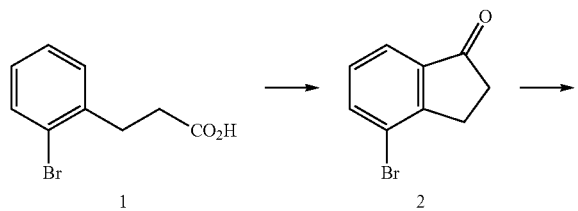

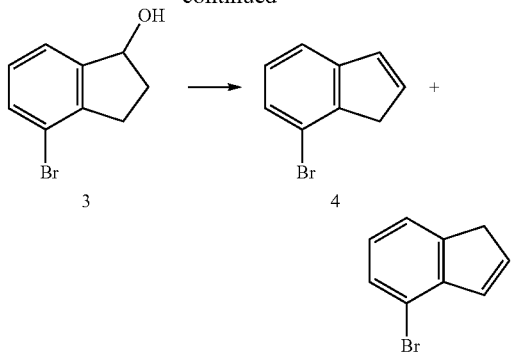

4-Bromo-2,3-dihydro-1H-inden-1-one (2)

3-(2-Bromophenyl)propanoic acid (1) (550 g, 2.4 mol, 1 equiv) was dissolved in 1,2-dichloroethane (5.5 L). Thionyl chloride (437.8 mL, 6 mol, 2.5 equiv) was added to the solution and the mixture was refluxed for 24 hours. The reaction was cooled to room temperature and concentrated under reduced pressure. The residue was dissolved in methylene chloride (1 L) and added dropwise to a mechanically stirred suspension of anhydrous aluminum chloride (526.9 g, 3.96 mol, 1.65 equiv) in dichloromethane (1 L) while keeping the reaction temperature below 27° C. The reaction was stirred at room temperature for three hours before being quenched into a five gallon bucket which was half-full of ice. The resulting mixture was extracted with dichloromethane (3×3 L). The combined organic layers were washed sequentially with saturated brine (2 L) and saturated sodium bicarbonate (2 L). The organic layer was dried over sodium sulfate, and concentrated under reduced pressure. The resulting solid was dried overnight in a vacuum oven at 30° C. to give compound 2 (435 g, 86% yield) as an off-white solid.

4-Bromo-2,3-dihydro-1H-inden-1-ol (3)

A solution of compound 2 (435 g, 2.06 mol, 1 equiv) in ethanol (5 L) was treated with sodium borohydride (101.6 g, 2.68 mol, 1.3 equiv) and stirred overnight at room temperature. The reaction was concentrated under reduced pressure and the residue partitioned between 4 L of dichloromethane and 4 L of 10% aqueous hydrochloric acid. The layers were separated and the aqueous layer was extracted with dichloromethane (3×1 L). The combined organic layers were washed with saturated brine (2 L), dried over sodium sulfate and concentrated under reduced pressure. The resulting solid was dried overnight in a vacuum oven at 30° C. to give compound 3 (422 g, 96% yield) as an off-white solid.

4-Bromo-1H-indene (4)

Compound 3 (150 g, 704 mmol, 1 equiv) was suspended in a mixture of concentrated sulfuric acid (250 mL) and water (1.25 L). The mixture was refluxed overnight. The reaction was cooled and extracted with 1.5 L of dichloromethane. The organic layer was washed with saturated sodium bicarbonate (1.5 L), dried over sodium sulfate, and concentrated under reduced pressure. The residue was purified over silica gel (800 g), eluting with heptanes to give compound 4 (95 g, 69% yield) as a light yellow oil.

Scheme 3

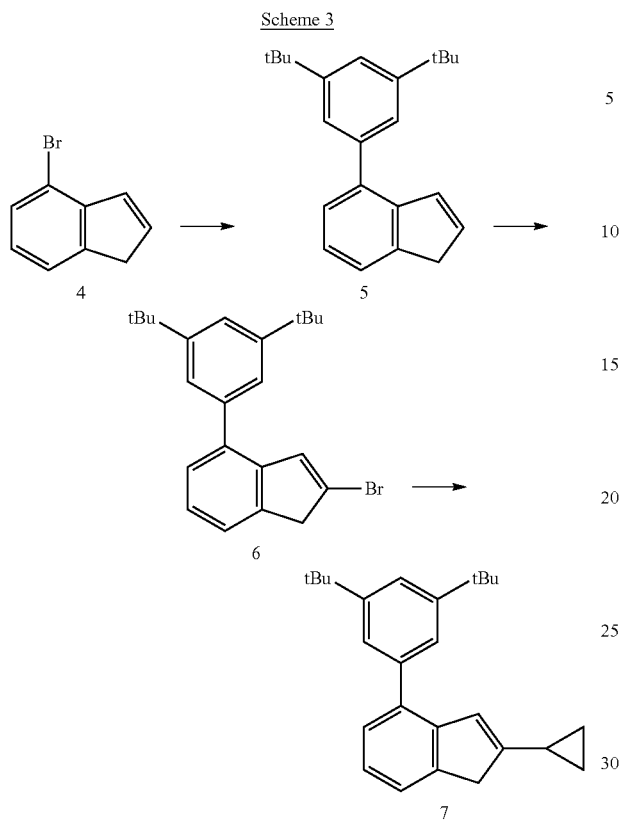

4-(3,5-Di-tert-butylphenyl)-1H-indene (5)

Mixture of compound 4 (60 g, 308 mmol, 1 equiv), 2-(3,5-di-tert-butylphenyl)-4,4,5,5-tetramethyl-1,3,2-dioxaborolane (126 g, 400 mmol, 1.3 equiv), powdered potassium carbonate (128 g, 924 mmol, 3 equiv) and bis(triphenylphosphine)palla-dium(II)dichloride (25.3 g, 31 mmol, 0.1 equiv), 1,4-dioxane (300 mL) and water (150 mL) was heated overnight at 80° C. The reaction was poured into 700 mL of water and extracted with ethyl acetate (3×500 mL). The combined organic layers were washed with saturated brine (1 L), dried over sodium sulfate, and concentrated under reduced pressure. The resulting residue was purified over silica gel (1 Kg) eluting with heptanes to give compound 5 (59 g, 63% yield) as a light yellow oil.

2-Bromo-4-(3,5-di-tert-butylphenyl)-1H-indene (6)

A cold solution (5° C.) of compound 5 (49 g, 161 mmol, 1 equiv), dimethyl sulfoxide (500 mL) and water (5 mL) was treated in one portion with N-bromosuccinimide (43 g, 241 mmol, 1.5 equiv). The bath was removed and the reaction allowed to stir at room temperature overnight. The reaction was poured into water (1 L) and the mixture extracted with ethyl acetate (2×500 mL). The combined organic layers were washed with saturated brine (1 L), dried over sodium sulfate and concentrated under reduced pressure. The resulting residue was dissolved in toluene (500 mL) and p-toluenesulfonic acid (6.2 g, 32.6 mmol, 0.2 equiv) was added. The mixture was refluxed for 20 hours while removing water with a Dean-Stark trap. The reaction was cooled to room temperature and concentrated under reduced pressure. The resulting residue was purified over silica gel (1 Kg) eluting with heptanes to give compound 6 (41 g, 66% yield) as a white solid.

2-Cyclopropyl-4-(3,5-di-tert-butylphenyl)-1H-indene (7)

A solution of compound 6 (16.1 g, 42.0 mmol, 1 equiv) and anhydrous toluene (200 mL) was treated with [1,1′-bis(diphenylphos-phino)ferrocene]dichlopalladium(II) DCM adduct (3.43 g, 4.2 mmol, 0.1 equiv). After stirring for 10 minutes, 0.5 M cyclopropylmagnesium bromide in tetrahydrofuran (420 mL, 210 mmol, 5 equiv) was added dropwise. The reaction was heated at 60° C. overnight. The reaction was cooled with an ice bath, acidified with 1N HCl to pH 3 and extracted with ethyl acetate (3×500 mL). The combined organic layers were washed with saturated brine (800 mL), dried over sodium sulfate, and concentrated under reduced pressure. The residue was purified on an AnaLogix (65-200 g) column with dry-loading, eluting with heptanes to give compound 7 (7.0 g, 48% yield) as a white solid.

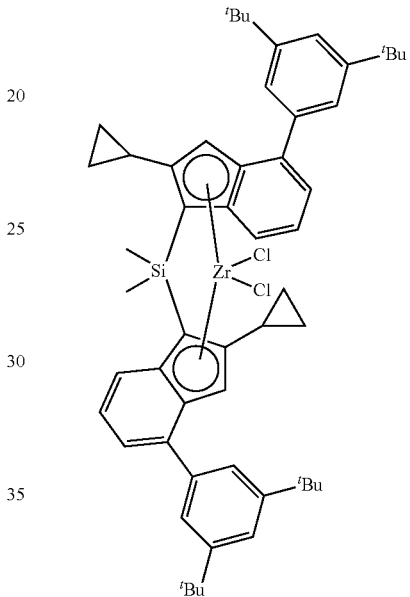

Lithium{1-[2-cyclopropyl-4-(3,5-di-tert-butylphenyl)indenide]}

A solution of 2-cyclopropyl-7-(3,5-di-tert-butylphenyl)-indene (5.93 g, 17.21 mmol) in diethyl ether (40 mL) was precooled at −35° C. for 30 min nBuLi (2.5 M, 7 mL, 17.5 mmol) was added. The solution was stirred at room temperature for 16 h. All volatiles were evaporated. The residue was washed with pentane (10 mL×4, 40 mL×1) and dried under vacuum to give the crude product (4.68 g).

Chloro(2-cyclopropyl-4-(3,5-di-tert-butylphenyl)-indenyl)dimethylsilane

A solution of lithium {1-[2-cyclopropyl-4-(3,5-di-tert-butylphenyl)indenide]} (2.38 g, 6.791 mmol) in diethyl ether (30 mL) was precooled at −35° C. for 10 min Me2SiCl2 (12.9 g, 99.95 mmol) was added and the white slurry was stirred at room temperature for 28 h. All volatiles were evaporated. The residue was extracted with pentane (40 mL). The pentane filtrate was evaporated to dryness under vacuum to give chloro(2-cyclopropyl-4-(3,5-di-tert-butylphenyl)-indenyl)dimethylsilane as a white sticky solid (1.68 g).

(2-Cyclopropyl-4-(3,5-di-tert-butylphenyl)-indenyl)dimethylsilyl trifluoromethanesulfonate A solution of chloro(2-cyclopropyl-4-(3,5-di-tert-butylphenyl)-indenyl)dimethylsilane (1.64 g, 3.752 mmol) in toluene (10 mL) was added to stirring mixture of silver trifluoromethanesulfonate (1 g, 3.892 mmol) in toluene (10 mL). The slurry was stirred at room temperature for 3 h. Toluene was removed under vacuum and the residue was extracted with pentane (40 mL). The pentane filtrate was concentrated under vacuum to give crude (2-cyclopropyl-4-(3,5-di-tert-butylphenyl)-indenyl)dimethylsilyl trifluoromethanesulfonate (1.93 g).

Bis(2-cyclopropyl-4-(3,5-di-tert-butylphenyl)-indenyl)dimethylsilane

A precooled solution of lithium {1-[2-cyclopropyl-4-(3,5-di-tert-butylphenyl)indenide]} (1.26 g, 3.595 mmol) in diethyl ether (20 mL) was added to a precooled solution (−35° C. for 30 min) of (2-cyclopropyl-4-(3,5-di-tert-butylphenyl)-indenyl)dimethylsilyl trifluoromethanesulfonate (1.93 g, 3.504 mmol) in diethyl ether (10 mL). The mixture was stirred at room temperature for 23 h. All volatiles were removed under vacuum. The residue was extracted with pentane (40 mL). The pentane filtrate was evaporated to dryness to give the crude product (2.6 g).

Dilithium dimethylsilyl bis{1-[2-cyclopropyl-4-(3,5-di-tert-butylphenyl)indenide]}

Then the above crude product (2.54 g, 3.408 mmol) was dissolved in diethyl ether (25 mL) and precooled at −20° C. for 1 h. nBuLi (2.5 M, 2.8 mL, 7 mmol) was added. The solution was stirred at room temperature for 22 h. All volatiles were removed under vacuum. The residue was washed with pentane (5 mL×3) and dried under vacuum to give the dilithium compound as an Et2O (0.88 eq) adduct (2.66 g).

Dimethylsilyl bis(2-cyclopropyl-4-(3,5-di-tert-butylphenyl)-indenyl)zirconium dichloride A precooled solution of {dilithium dimethylsilyl bis{1-[2-cyclopropyl-4-(3,5-di-tert-butylphenyl)indenide]}} [Et2O]0.88 (2.64 g, 3.211 mmol) in Et2O (15 mL) was added to precooled of ZrCl4 (0.75 g, 3.218 mmol) in Et20 (20 mL). The slurry was stirred at room temperature for 20 h. The mixture was evaporated to dryness. The residue was extracted with pentane (15 mL once, 5 mL once) (Fraction 1). The residue was then extracted with toluene (15 mL) (Fraction 2).
Fraction 1: The pentane filtrate was concentrated to dryness under vacuum to give the crude metallocene. Crystallization of the crude product in pentane (20 mL) at −15° C. affords the metallocene with a rac/meso-ratio of 7:1 (0.79 g, 27%). Further fractional crystallization separation yields rac-dimethylsilyl bis(2-cyclopropyl-4-(3,5-di-tert-butylphenyl)-indenyl)zirconium dichloride as a yellow solid (0.15 g, 5.2%, rac meso ratio of greater than 20:1, hereinafter referred to as Catalyst A). (This fraction was used for synthesis of supported catalyst).
Fraction 2: Toluene filtrate was concentrated to dryness to give 0.74 g (25%) of metallocenes with a rac/mese ratio of 1:28. Further washing 0.5 g of this material with pentane affords 0.4 g of metallocene with a rac/meso ratio of 1:56. 1H NMR (400 MHz, C6D6, 23° C.): rac: δ 7.95 (m, 4H), 7.62 (m, 2H), 7.49 (m, 4H), 6.98 (s, 2H), 6.90 (m, 2H), 1.84 (m, 2H), 1.42 (s, 36H), 0.99 (s, 6H, SiMe2), 0.86 (m, 2H), 0.66 (m, 2H), 0.50 (m, 2H), 0.13 (m, 2H). meso: 7.92 (m, 4H), 7.61 (m, 2H), 7.59-7.27 (m, 4H), 6.86-6.82 (m, 4H), 1.91 (m, 2H), 1.44 (s, 36H), 1.27 (m, 2H), 1.09 (s, 3H, SiMe), 0.91 (s, 3H, SiMe), 0.68 (m, 2H), 0.61 (m, 2H), 0.13 (m, 2H).

Supported rac-Dimethylsilyl bis(2-cyclopropyl-4-(3,5-di-tert-butylphenyl)-indenyl)zirconium dichloride (Catalyst-2)

In a 20 mL vial Catalyst A (rac-dimethylsilyl bis(2-cyclopropyl-4-(3,5-di-tert-butylphenyl)-indenyl)zirconium dichloride) (25.2 mg, 0.0278 mmol) was stirred alongside MAO (30% by weight in toluene, 0.2345 g of solution) along with another 2 mL of toluene for 1 h. In a small celstir Davison 948 Silica (calcined at 130° C.) pretreated with MAO (SMAO) (0.6954 g) was slurried in 20 mL of toluene. The celstir was chilled for 1 min in the freezer (−35° C.) before the catalyst solution was added to the slurry. The slurry was stirred for 1 h while spending 1 min of every 10 min in the freezer. The slurry was then heated to 40° C. and stirred for 2 h. The slurry was filtered using a fine glass frit, and then reslurried in 20 mL of toluene and stirred for an additional 30 min at 60° C. The slurry was filtered again, and then reslurried in 20 mL of toluene and stirred for an additional 30 min at 60° C. The slurry was filtered, and then reslurried in 20 mL of toluene and stirred for an additional 30 min at 60° C. and then filtered for the final time. The celstir was washed out with 20 mL of toluene and the solid was dried under vacuum. Collected 0.619 g of pink solid. The SMAO is typically prepared as follows: 130° C. Calcined Davison 948 Silica (20.8606 g, calcined at 130° C.) was slurried in 121 mL of toluene and chilled in the freezer (approx. −35° C.). MAO (50.5542 g of a 30% wt solution in toluene) was added slowly in 3 parts with the silica slurry returned to the freezer for a few minutes (approx. 2 minutes) between additions. The slurry was stirred at room temperature for 2 h, filtered with a glass frit filter, reslurried in 80 mL of toluene for 15 min at room temperature, and then filtered again. The solid was reslurried in 80 mL of toluene at 80° C. for 30 min and then filtered. The solid was reslurried in 80 mL of toluene at 80° C. for 30 min and then filtered a final time. The celstir and solid were washed out with 40 mL of toluene. The solid was then washed with pentane and dried under vacuum for 24 h. Collected 28.9406 g of a free flowing white powder.

Dimethylsilyl(4-o-biphenyl-2-cyclopropyl-indenyl) (4-(3,5-di-tert-butylphenyl)-2-methyl-indenyl)zirconium dichloride Indene Synthesis:

Scheme 4

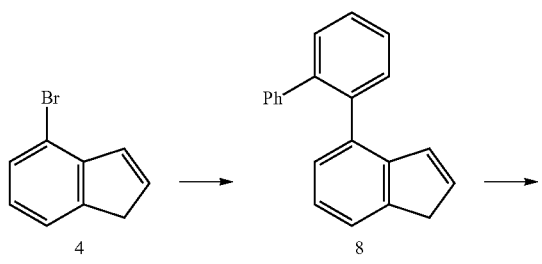

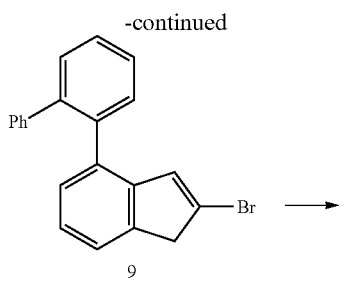

9

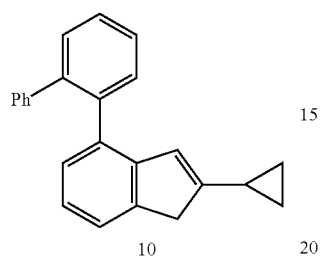

10

4-([1,1'-Biphenyl]-2-yl)-1H-indene (8): A mixture of compound 4 (40 g, 205 mmol, 1 equiv), (biphenyl-2-yl) boronic acid (81.2 g, 410 mmol, 2 equiv), powdered potassium carbonate (85 g, 615 mmol, 3 equiv), and bis(triphenylphosphine)palladium(II)dichloride (7.2 g, 10.3 mmol, 0.05 equiv), 1,4-dioxane (300 mL) and water (150 mL) was heated overnight at 80° C. The reaction was poured into 500 mL of water and extracted with ethyl acetate (3×400 mL). The combined organic layers were washed with saturated brine (300 mL), dried over sodium sulfate, and concentrated under reduced pressure. The resulting residue was purified over silica gel (400 g) eluting with heptanes to give compound (8) (50 g, 91% yield) as a light-yellow oil that slowly turned to an off-white solid on standing.

4-([1,1'-Biphenyl]-2-yl)-2-bromo-1H-indene (9)

A cold solution (5° C.) of compound 8 (40 g, 149 mmol, 1 equiv), dimethyl sulfoxide (400 mL) and water (5 mL) was treated in one portion with N-bromosuccinimide (39.8 g, 224 mmol, 1.5 equiv). The bath was removed and the reaction allowed to stir at room temperature overnight. The reaction was poured into water (1 L) and extracted with ethyl acetate (2×500 mL). The combined organic layers were washed with saturated brine (1 L), dried over sodium sulfate, and concentrated under reduced pressure. The resulting residue was dissolved in 500 mL of toluene and p-toluenesulfonic acid (5.6 g, 29.4 mmol, 0.2 equiv) was added. This mixture was refluxed for 20 h while removing water with a Dean-Stark trap. The reaction was cooled to room temperature and concentrated under reduced pressure. The resulting residue was purified over silica gel (1 Kg), eluting with heptanes to give compound 9 (39 g, 75% yield) as a light yellow solid.

4-([1,1'-Biphenyl]-2-yl)-2-cyclopropyl-1H-indene (10)

A solution of compound 9 (10 g, 28.8 mmol, 1 equiv) and anhydrous toluene (100 mL) was treated with bis(triphenylphosphine)-palladium(II)dichloride (2.35 g, 2.9 mmol, 0.1 equiv). After stirring for 10 minutes, 0.5 M cyclopropylmagnesium bromide in tetrahydrofuran (300 mL, 149.7 mmol, 5.2 equiv) was added dropwise. The reaction was heated at 60° C. overnight. Additional bis(triphenylphosphine)-palladium(II)dichloride (2.35 g, 2.9 mmol, 0.1 equiv) was added and the reaction heated at 60° C. for an additional 24 hours. The reaction was concentrated under reduced pressure and the residue partitioned between water (1 L) and ethyl acetate (1 L). The layers were separated and the aqueous layer washed with ethyl acetate (1 L). The combined organic layers were washed with saturated brine (1 L), dried over sodium sulfate, and concentrated under reduced pressure. The resulting residue was purified over silica gel (200 g) eluting with heptanes to give compound 10 (3.3 g, 37% yield) as a light yellow oil.

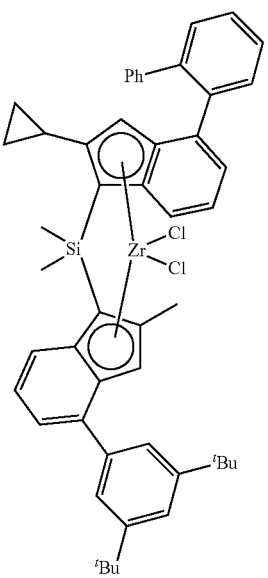

Lithium[1-(4-o-biphenyl-2-cyclopropyl indenide)]

A solution of 7-o-biphenyl-2-cyclopropyl-indene (2.538 g, 8.229 mmol) in diethyl ether (40 mL) was precooled at −35° C. for 0.5 h. nBuLi (2.5 M, 3.3 mL, 8.25 mmol) was added. The solution was stirred at room temperature for 18 h. All volatiles were evaporated. The yellow solid was washed with pentane (5 mL twice, 10 mL once) and dried under vacuum to give the lithium compound (2.11 g).

Lithium {1-[4-(3,5-di-tert-butylphenyl)-2-methyl indenide]}

A solution of 7-(3,5-di-tert-butylphenyl)-2-methyl-indene (5.46 g, 17.14 mmol) in diethyl ether (50 mL) was precooled at −35° C. for 0.5 h. nBuLi (2.5 M, 7 mL, 17.5 mmol) was added. The solution was stirred at room temperature for 17 h. All volatiles were evaporated. The residue was washed with hexane (10 mL×4) and dried under vacuum to give the crude product (5.7 g).

Chlorodimethyl[4-(3,5-di-tert-butylphenyl)-2-methyl-indenyl]silane

A solution of the above crude product (1.4 g, 4.315 mmol) in diethyl ether (20 mL) was precooled at −35° C. for 30 min Me2SiCl2 (8 g, 61.99 mmol) was added and the white slurry was stirred at room temperature for 17 h. All volatiles were evaporated. The residue was extracted with pentane (20 mL)

and the filtrate was concentrated to dryness under vacuum to give the product (1.74 g, 98%).

Dimethylsilyl[4-(3,5-di-tert-butylphenyl)-2-methyl-indenyl]trifluoromethanesulfonate A solution of chlorodimethyl[4-(3,5-di-tert-butylphenyl)-2-methyl-indenyl]silane (1.71 g, 4.16 mmol) in toluene (10 mL) was added to a solution of silver trifluoromethanesulfonate (1.1 g, 4.28 mmol) in toluene (5 mL) with stirring. The white slurry was stirred at room temperature for 3 h. Toluene was removed under vacuum and the residue was extracted with pentane (25 mL). The pentane filtrate was concentrated under vacuum to give the product (1.88 g).

(4-o-Biphenyl-2-cyclopropyl-indenyl)(4-(3,5-di-tert-butylphenyl)-2-methyl-indenyl)dimethylsilane A precooled solution of dimethylsilyl[4-(3,5-di-tert-butyl-phenyl)-2-methyl-1H-inden-1-yl]trifluoromethanesulfonate (0.71 g, 1.353 mmol) in diethyl ether (10 mL) was added to a precooled mixture of lithium[1-(4-o-biphenyl-2-cyclopropyl indenide)] (0.435 g, 1.384 mmol) in diethyl ether (20 mL). The solution was stirred at room temperature for 17 h. Diethyl ether was evaporated. The residue was extracted with pentane (30 mL) and the pentane filtrate was concentrated under vacuum to give the crude product as a white solid (0.9 g).

Dilithium dimethylsilyl(4-o-biphenyl-2-cyclopropyl indenide) (4-(3,5-di-tert-butylphenyl)-2-methyl indenide)

nBuLi (2.5 M, 1 mL, 2.5 mmol) was added to a precooled solution of the above product (0.86 g, 1.259 mmol) in diethyl ether (25 mL). The solution was stirred at room temperature for 22 h. All volatiles were removed under vacuum. The residue was washed with pentane (10 mL×2) and dried under vacuum to give the dilithium compound as an Et20 adduct (0.915 g).

Dimethylsilyl(4-o-biphenyl-2-cyclopropyl-indenyl) (4-(3,5-di-tert-butylphenyl)-2-methyl-indenyl)zirconium dichloride A precooled solution of the above [dilithium dimethylsilyl (4-o-biphenyl-2-cyclopropyl indenide) (4-(3,5-di-tert-butyl-phenyl)-2-methyl indenide)][Et2O] (0.9 g, 1.17 mmol) in Et2O (15 mL) was added to a precooled slurry of ZrCl4 (0.275 g, 1.18 mmol) in Et2O (15 mL). The mixture was stirred at room temperature for 20 h. The solution was evaporated to dryness. The residue was washed with pentane (15 mL once and 5 mL once) and then extracted with toluene (20 mL). The toluene filtrates were evaporated to dryness and washed with diethyl ether and then pentane to afford 0.11 g (11%) of the metallocene with a rac/meso-ratio of 5:1. The product was further washed with diethyl ether to give 0.04 g (4.1%) of dimethylsilyl(4-o-biphenyl-2-cyclopropyl-indenyl) (4-(3,5-di-tert-butylphenyl)-2-methyl-indenyl)zirconium dichloride with a rac/meso ratio of 33:1. 1H NMR (400 MHz, CD2Cl2, 23° C.): rac: δ 7.67 (m, 1H), 7.59 (m, 2H), 7.4 (m, 6H), 7.33 (m, 1H), 7.15 (m, 1H), 7.08 (m, 5H), 7.01 (m, 1H), 6.96 (m, 1H), 6.85 (s, 1H), 6.00 (s, 1H), 2.22 (s, 3H), 1.89 (m, 1H), 1.34-1.32 (tBu×2 overlapped with SiMe2, 24H), 0.94 (m, 1H), 0.73-0.60 (m, 2H), 0.15 (m, 1H). Characteristic 1H NMR chemical shifts for meso: δ 5.83 (s, 1H), 2.38 (s, 3H), 1.90 (m, 1H), 1.46 (s, 3H, SiMe), 1.33 (s, 18H, tBu×2), 1.23 (s, 3H, SiMe).

Supported Dimethylsilyl(4-o-biphenyl-2-cyclopropyl-indenyl) (4-(3,5-di-tert-butylphenyl)-2-methyl-indenyl) Zirconium Dichloride (Catalyst 3)

In a 20 mL vial the metallocene (19.4 mg, 0.0230 mmol) was stirred alongside MAO (30% by weight in toluene, 0.2125 g of solution) along with another 2 mL of toluene for 1 h. In a small celstir SMAO (prepared as described above) (0.5747 g) was slurried in 20 mL of toluene. The celstir was chilled for 1 min in the freezer (−35° C.) before the catalyst solution is added to the slurry. The slurry was stirred for 1 h while spending 1 min of every 10 min in the freezer. The slurry was then heated to 40° C. and stirred for 2 h. The slurry was then filtered using a fine glass frit, reslurried in 20 mL of toluene and stirred for an additional 30 min at 60° C. The slurry was then filtered, reslurried in 20 mL of toluene and stirred for an additional 30 min at 60° C. The slurry was then filtered, reslurried in 20 mL of toluene and stirred for an additional 30 min at 60° C. and then filtered for the final time. The celstir was washed out with 20 mL of toluene and the solid was dried under vacuum. Collected 0.5044 g of pink solid.

Supported rac-Dimethylsilyl Bis(2-methyl-4-phenyl-indenyl) Zirconium Dichloride (Catalyst-1)

In a 20 mL the metallocene (23.3 mg, 0.0396 mmol) was stirred alongside MAO (30% by weight in toluene, 0.3278 g of solution) along with another 2 mL of toluene for 1 h. In a small celstir S*MAO (prepared as described below) (0.9915 g) was slurried in 20 mL of toluene. The catalyst solution was added to the slurry. The slurry stirred for 1 h. The slurry was then filtered using a fine glass frit, washed four times with 20 mL of toluene, and the red solid was dried under vacuum. Collected 0.9639 g of red solid. The S*MAO is typically prepared as follows: In a celstir, MS-3050 silica (600° C. calcined, 8.8627 g) was slurried in 90 mL of toluene. MAO (25.9320 g of a 30% wt toluene solution) was added slowly to the slurry. The slurry was stirred at room temperature for 1 h and then 80° C. for 20 min Reaction monitoring via NMR showed high MAO uptake. An additional 2.8644 g of the MAO solution was added to the slurry and stirred for another 20 min NMR analysis showed full saturation of silica by the MAO. The slurry was filtered with a glass frit filter and washed three times with 25 mL of toluene and one time with 40 mL of toluene. The solid was dried under vacuum for 24 h. 15.0335 g of a free flowing white solid were collected.

Characterization
Gel Permeation Chromatography-DRI (GPC-DRI)

Mw, Mn and Mw/Mn are determined by using a High Temperature Gel Permeation Chromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation.

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, IDRI, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both PE and PP.

The mass recovery is calculated from the ratio of the integrated area of the concentration chromatography over elution volume and the injection mass which is equal to the pre-determined concentration multiplied by injection loop volume.

All molecular weights are reported in g/mol unless otherwise noted.

Melt Flow Rate (MFR)

MFR was measured as per ASTM D1238, condition L, at 230° C. and 2.16 kg load.

Differential Scanning Calorimetry (DSC)

Peak crystallization temperature (Tc) and peak melting temperature (Tm) was measured via Differential Scanning calorimetry (DSC) using a DSCQ200 unit. The sample was first equilibrated at 25° C. and subsequently heated to 220° C. using a heating rate of 10° C./min (first heat). The sample was held at 220° C. for 3 min. The sample was subsequently cooled down to −100° C. with a constant cooling rate of 10° C./min (first cool). The sample was equilibrated at −100° C. before being heated to 220° C. at a constant heating rate of 10° C./min (second heat). The exothermic peak of crystallization (first cool) was analyzed using the TA Universal Analysis software and the corresponding to 10° C./min cooling rate was determined. The endothermic peak of melting (second heat) was also analyzed using the TA Universal Analysis software and the peak melting temperature (Tm) corresponding to 10° C./min heating rate was determined Areas under the DSC curve are used to determine the heat of transition (heat of fusion, Hf, upon melting or heat of crystallization, Hc, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the Polymer Handbook, Fourth Edition, published by John Wiley and Sons, New York 1999, except that a value of 290 J/g is used for H° (polyethylene), a value of 140 J/g is used for H° (polybutene), and a value of 207 J/g is used for H° (polypropylene).

Secant Flexural Modulus

1% secant flexural modulus) was measured using a ISO 37-Type 3 bar, with a crosshead speed of 1.0 mm/min and a support span of 30.0 mm using an Instron machine according to ASTM D 790 (A, 1.0 mm/min).

Size Exclusion Chromatography

In conducting the 13C NMR investigations, samples were dissolved in d2-1,1,2,2-tetrachloroethane at concentrations between 10 to 15 wt % in a 10 mm NMR tube. 13C NMR data was collected at 120° C. using a Varian 400 spectrometer with a 1H frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest.

EXAMPLES

Catalyst 1 is silica supported Me2Si(2-Me-4-Ph-Ind)2ZrCl2.

Catalyst 2 is silica supported Me2Si(2-cPr-4-(3',5'-tBu2-Ph)-Ind)2ZrCl2)

Polymerizations

The propylene polymerization reactions were carried out under staged hydrogen addition conditions (e.g. No H2 in first 40 minutes of the reactor run then using various pressures of H2 in the next 20 minutes of the reactor run). This produced broad/bi-modal MWD iPP with excellent stiffness properties in the MFR (50 dg/min or more).

General Procedure for Reactor Propylene Polymerization Using Silica-Supported Catalysts Procedure 1

Supported catalyst (ca. 0.6 g) (Catalyst-1 or Catalyst-2) was slurried into dry HYDROBRITE™ oil to yield a slurry that contains 5% by weight of the supported catalyst. A catalyst slurry containing the supported catalysts (see Table 1) was injected using 250 ml propylene into a 2 L autoclave reactor containing propylene (1000 mL) (total propylene 1250 ml), H2 (provided from a 183 mL container), and tri-n-octylaluminum, 1.0 mls of a 4.76 vol % hexane solution, at room temperature for 5 minutes. Subsequently, the reactor temperature was raised to the run temperature for 30 to 50 minutes. After the allotted time the reactor was cooled to room temperature and vented.

Procedure 2

The procedure above was followed except that after the 30-50 minutes the reactor was not cooled and vented. Instead, hydrogen (provided from a 183 mL container) was added into the reactor at a desired loading to effect chain termination. After the 10-15 minutes the reactor was cooled to room temperature, vented, and the resulting polymer was removed from the reactor. Under this procedure it is noted that the cooling and venting procedure allows exposure of the reaction to hydrogen to extend for approximately 10 to 20 minutes.

Procedure 3

Supported catalyst (ca. 0.6 g) (Catalyst-1 or Catalyst-2) was slurried into dry HYDROBRITE™ oil to yield a slurry that contains 5% by weight of the supported catalyst. A catalyst slurry containing certain amounts of catalysts (see Table 1) was injected using 250 ml propylene into a 2 L autoclave reactor containing propylene (1000 mL) (total propylene 1250 ml), and tri-n-octylaluminum, 1.0 mls of a 4.76 vol % hexane solution, at room temperature for 5 minutes. Subsequently, the reactor temperature was raised to the run temperature for an allotted period of time. After the time indicated in Table 1 time H2 (provided from a 183 mL container) was added into the reactor at a desired loading to effect chain termination. After the allotted time the reactor was immediately vented and reactor was allowed to cool to room temperature.

Capillary rheology of selected polymers was conducted according to ASTM D3835-02 on an Alpha Technologies™ ARC 2020 capillary rheometer using die Y400-30RC (nominally 1 mm diameter, 30.5 mm length and 90° entry angle) at 190° C. The rheometer was packed and allowed to come to thermal equilibrium for 120 seconds prior to initiating the test. Rabinowitch correction was performed as described at B. Rabinowitsch, Z. Physik. Chem., A 145, 1 (1929) using software program LAB KARS Advanced Rheology Software version 3.92 available from Alpha Technologies Services, Akron, Ohio. The Rabinowitch corrected shear viscosity ("RCSV") data is shown in Table A below.

TABLE A

| Shear Rate (1/s) | Example 6 RCSV (Pa · s) | Example 15 RCSV (Pa · s) | Example 16 RCSV (Pa · s) | Example 4 RCSV (Pa · s) |
|---|---|---|---|---|
| 1 | 2284.05 | 866.9 | 3238.65 | 1760.4 |
| 2.5 | 784.3 | 588.95 | 1225.2 | 1087.45 |
| 5 | 408.65 | 342.9 | 612.35 | 663.15 |
| 7.5 | 329.2 | 242.05 | 477.85 | 469.45 |
| 10. | 313.1 | 189.95 | 429.1 | 377.4 |
| 25 | 292.05 | 116.45 | 330.3 | 217.2 |
| 50 | 252.2 | 116.55 | 247.75 | 206.55 |
| 75 | 219.65 | 126.95 | 201.05 | 249.45 |
| 100 | 200.05 | 113.3 | 173.8 | 227.45 |
| 250 | 134.35 | 75 | 104.5 | 153.25 |
| 500 | 93.65 | 52.35 | 68.5 | 88 |
| 750 | 73.9 | 41.75 | 53.05 | 78 |

TABLE A-continued

| Shear Rate (1/s) | Example 6 RCSV (Pa · s) | Example 15 RCSV (Pa · s) | Example 16 RCSV (Pa · s) | Example 4 RCSV (Pa · s) |
|---|---|---|---|---|
| 1000 | 62.45 | 35.45 | 44.75 | 66.05 |
| 1500 | 48.75 | 28.35 | 35.2 | 45.35 |
| 2000 | 41 | 24.1 | 29.7 | 42.2 |

TABLE 1

Propylene Polymerization Using Silica-Supported Catalysts at 70° C.

| Example | Catalyst | Amount of oil slurry containing catalyst | Procedure | Stage 1 $H_2$ (mmols)/run time (min) | Stage 2 $H_2$ (mmols)/run time (min) | MFR dg/min | Yield (g) | Activity (g P/g sup. cat) | $M_n$ (kg/mol) | $M_w$ (kg/mol) | $M_w/M_n$ | 1% Secant flexural modulus (MPa) | Tm (° C.) | Tc (° C.) |
|---|---|---|---|---|---|---|---|---|---|---|---|---|---|---|
| 1 | 1 | 0.209 | 1 | 2.07/50 | NA | 0.16 | 21.1 | 2019 | | | | 1676 | | |
| 2 | 1 | 1.15 | 1 | 10.3/50 | NA | 26 | 123 | 2139 | 29.2 | 205.6 | 7.0 | 1378 | | |
| 3 | 1 | 1.16 | 1 | 11.9/50 | NA | 59 | 110 | 1897 | 29.6 | 157.7 | 5.3 | 1427 | | |
| 4 | 1 | 1.15 | 1 | 12.9/50 | NA | 74 | 136 | 2365 | 29.5 | 191.4 | 6.5 | 1453 | | |
| 5 | 1 | 1.16 | 1 | 15.5/50 | NA | 138 | 124 | 2138 | 20.3 | 115.7 | 5.7 | 1464 | | |
| 6 | 1 | 1.06 | 2 | 0/50 | 23.8/10 | 75 | 63.9 | 1206 | 20.0 | 207.9 | 10.4 | 1621 | 149.4 | 113.3 |
| 7 | 1 | 1.25 | 3 | 0/50 | 15.5/10 | 0.37 | 20.2 | 323 | 80.9 | 498.5 | 6.2 | 1601 | 150.2 | 113.1 |
| 8 | 1 | 1.06 | 3 | 0/30 | 23.8/10 | 4.1 | 41.9 | 791 | 21.3 | 438.4 | 20.5 | 1577 | 150.5 | 113.1 |
| 9 | 1 | 1.06 | 3 | 0/30 | 23.8/10 | 37 | 43.5 | 821 | 20.5 | 500.5 | 24.4 | 1640 | 150.4 | 112.9 |
| 10 | 1 | 1.05 | 3 | 0/30 | 23.8/15 | 63 | 57.3 | 1091 | 18.5 | 322.3 | 17.5 | 1571 | 149.9 | 114.1 |
| 11 | 2 | 1.22 | 1 | 0/40 | NA | 2.5 | 46.3 | 759 | 102.2 | 350.8 | 3.4 | 1576 | 154.4 | 112.4 |
| 12 | 2 | 1.20 | 1 | 3.62//50 | NA | 42 | 169.4 | 2823 | 46.3 | 167.4 | 3.6 | 1255 | 153.8 | 113.1 |
| 13 | 2 | 1.21 | 1 | 4.65/50 | NA | 63 | 180.5 | 2983 | 47.0 | 148.7 | 3.2 | 1327 | 153.8 | 112.7 |
| 14 | 2 | 1.20 | 1 | 7.24/50 | NA | 181 | 205.7 | 3428 | 31.6 | 116.0 | 3.7 | 1202 | 154.1 | 114.3 |
| 15 | 2 | 1.21 | 2 | 0/40 | 15.5/10 | 107 | 124 | 2050 | 24.9 | 188.6 | 7.6 | 1695 | 153.8 | 116.5 |
| 16 | 2 | 1.21 | 3 | 0/40 | 15.5/10 | 53 | 103 | 1702 | 25.5 | 194.0 | 7.6 | 1740 | 153.8 | 115.4 |
| 17 | 2 | 1.22 | 2 | 0/40 | 21.7/10 | 820 | 120.6 | 1977 | 11.4 | 124.7 | 11 | 1971 | 153.2 | 117.1 |
| 18 | 2 | 1.22 | 2 | 0/30 | 22.7/10 | 834 | 134.7 | 2208 | 11.6 | 88.3 | 7.6 | 1999 | 153.6 | 119.5 |
| 19 | 3 | 0.760 | 1 | 9.3/50 | NA | 147 | 188 | 4947 | 38.3 | 136.5 | 3.6 | 1272 | 152.8 | 114.5 |
| 20 | 3 | 0.765 | 1 | 14.5/50 | NA | 417 | 205 | 5359 | 26.4 | 100.9 | 3.8 | 1234 | 153.0 | 112.9 |
| 21 | 3 | 0.763 | 3 | 0/30 | 15.5/10 | 105 | 54.8 | 1436 | 21.5 | 318.2 | 14.8 | 1649 | 153.1 | 113.7 |
| 22 | 3 | 0.760 | 1 | 5.17/50 | NA | 35 | 124 | 3263 | 50.1 | 205.8 | 4.1 | 1191 | 154.0 | 114.0 |
| 23 | 3 | 0.770 | 3 | 0/30 | 18.1/10 | 138 | 49.7 | 1291 | 20.1 | 330.3 | 16.5 | 1618 | 153.0 | 115.8 |
| 24 | 3 | 0.770 | 3 | 0/30 | 13.4/10 | 46 | 47.3 | 1229 | 22.4 | 331.7 | 14.8 | 1686 | 153.3 | 114.0 |

*mmoles $H_2$ estimated using ideal gas law assuming room temperature ~293K and volume of hydrogen addition 0.183 L at desired pressure ranging from 0.1 atm. to 4 atm. Catalyst 1 is silica supported $Me_2Si(2\text{-Me-4-Ph-Ind})_2ZrCl_2$; Catalyst 2 is silica supported $Me_2Si(2\text{-cPr-4-}(3',5'\text{-tBu}_2\text{-Ph})\text{-Ind})_2ZrCl_2)$; Catalyst 3 is supported dimethylsilyl (4-o-biphenyl-2-cyclopropyl-indenyl) (4-(3,5-di-tert-butylphenyl)-2-methyl-indenyl) zirconium dichloride.

| Example | Catalyst | Stage 1 $H_2$ (mmols)/time (min) | Stage 2 $H_2$ (mmols)/time (min) | [mmmm] | Stereo Defects (per 10,000 monomers) | 2,1 e Defects (per 10,000 monomers) | 3,1 Defects (per 10,000 monomers) | Avg. meso Run Length |
|---|---|---|---|---|---|---|---|---|
| 6 | 1 | 0/50 | 23.8/10 | 0.9669 | 75 | 95 | 4 | 57 |
| 15 | 2 | 0/40 | 15.5/10 | 0.9793 | 51 | 54 | 10 | 87 |

TABLE B

Comparison of the Rabinowitch corrected shear viscosities

| Example | Mw/Mn GPC-DRI | MFR (dg/min) | RCSV, at 1 sec$^{-1}$ (Pa · sec) | RCSV, at 2000 sec$^{-1}$ (Pa · sec) | Ratio of RCSV at 1 sec$^{-1}$:2000 sec$^{-1}$ | 1% Secant flexural modulus (MPa) |
|---|---|---|---|---|---|---|
| 15 | Bimodal | 107 | 866.9 | 24.1 | 36 | 1695 |
| 16 | Bimodal | 53 | 3238.65 | 29.7 | 109 | 1740 |
| 6 | Bimodal | 75 | 2284.05 | 41 | 56 | 1621 |
| 4 | Unimodal | 74 | 1760.4 | 42.2 | 42 | 1453 |

The Rabinowitch corrected shear viscosities at low shear rates in Table A are appreciably distinct, varying from 866 to 3238 Pa·sec, presumably reflecting a variation in melt strength and bulk physical properties.

Similar viscosities at the high shear rates probed by capillary rheology confirm similar processability under environments similar to commercial processing equipment. Thus, capillary rheology confirms the utility of existing commercial processing equipment to extract the performance benefits resulting from utilizing the inventive process described herein.

A direct comparison of comparative unimodal molecular weight distribution iPP (Example 4) versus bimodal molecular weight distribution iPP resulting from the inventive process (Example 6) at low and high shear rates is provided in Table B. This data confirms the higher viscosity of the bimodal iPP at low shear rates, as well as lower viscosity than a unimodal iPP of similar MFR at shear rates encountered during processing.

All documents described herein are incorporated by reference herein for purposes of all jurisdictions where such practice is allowed, including any priority documents, related application and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. An in-situ propylene polymer composition comprising at least 50 mole % propylene and at least 1 mol % comonomer, said in-situ propylene polymer composition having a Composition Distribution Breadth Index (CDBI) of 50% or more, a 1% secant flexural modulus of at least 1500 MPa, an Mw/Mn of at least 5, and a melt flow rate of 50 dg/min or more, wherein the CDBI is defined to be the percent of polymer whose composition is within 50% of the median comonomer composition as calculated from the composition distribution curve, wherein the curve is obtained by eluting 100 cm$^3$ of a polymer solution of about 1 percent concentration through a column of length 164 cm and 1.8 cm ID (inner diameter) packed with non-porous glass beads (2030 mesh) and immersed in a temperature programmable oil bath under 3 atmospheres pressure at 140° C. and maintained at 120° C., subsequently crystallizing the polymer solution by cooling the column to 0° C. at a cooling rate of −20° C./min and maintaining the column temperature at this temperature for 25 min, then eluting the polymer solution by pumping pure solvent, preheated to the temperature of the oil bath, through the column at a flow rate of 27 cm$^3$/min, and passing the effluent from the column through a heated line to an IR detector which is used to measure the absorbance of the effluent stream, wherein the absorbance of the polymer carbon-hydrogen stretching bands at about 2960 cm$^{-1}$ is used to measure the relative weight percent concentration of polymer fractions in the effluent, collecting polymer fractions in 3° C. intervals, followed by raising the temperature at a rate of 1° C./min to 120° C., to obtain a composition distribution curve.

2. The polymer of claim 1, wherein the polymer has more than 15 and less than 100 regio defects per 10,000 propylene units.

3. The polymer of claim 1, wherein the polymer has a Tc of 115° C. or more, wherein the Tc is determined by Differential Scanning calorimetry where a sample is first equilibrated at 25° C. and subsequently heated to 220° C. using a heating rate of 10° C./min, then holding at 220° C. for 3 min, followed by cooling the sample to −100° C. with a constant cooling rate of 10° C./min.

4. The polymer of claim 1, wherein the polymer has a multimodal molecular weight distribution as determined by GPC-DRI.

5. An in-situ propylene polymer comprising at least 50 mole % propylene, said in-situ propylene polymer composition having a 1% secant flexural modulus of at least 1500 MPa, an Mw/Mn of at least 5, a multimodal molecular weight distribution as determined by GPC-DRI, a melt flow rate of 50 dg/min or more, and an Rabinowitch corrected shear viscosity (RCSV) ratio (1 sec$^{-1}$ to 2000 sec$^{-1}$) of Y or more, where Y=38000X$^{-1.559}$, and X is the melt flow rate in dg/min of the propylene polymer.

6. A propylene polymer composition having:
  a) at least 50 mol % propylene;
  b) a 1% secant flexural modulus of at least 1500 MPa;
  c) an Mw/Mn of at least 5;
  d) a melt flow rate of 50 dg/min or more (230° C., 2.16 kg);
  e) a multimodal molecular weight distribution;
  f) more than 15 and less than 200 regio defects (sum of 2,1-erythro and 2,1-threo insertions and 3,1-isomerizations) per 10,000 propylene units; and
  g) an Rabinowitch corrected shear viscosity (RCSV) ratio (1 sec$^{-1}$ to 2000 sec$^{-1}$) of Y or more, where Y=38000X$^{-1.559}$, and X is the melt flow rate in dg/min of the propylene polymer.

7. A propylene polymer having a melt flow ratio or 50 dg/min or more and an RCSV ratio (1 sec$^{-1}$ to 2000 sec$^{-1}$) of Y or more, where Y=38000X$^{-1.559}$, and X is the melt flow rate in dg/min of the propylene polymer.

8. An injection molded article comprising the in-situ propylene polymer of claim 5, where the in-situ polymer has a 1% secant flexural modulus of at least 1600 MPa.

9. A propylene polymer composition having:
a) at least 50 mol % propylene;
b) a 1% secant flexural modulus of at least 1500 MPa;
c) an Mw/Mn of at least 5;
d) a melt flow rate of 50 dg/min or more (230° C., 2.16 kg);
e) a multimodal molecular weight distribution;
f) more than 15 and less than 200 regio defects (sum of 2,1-erythro and 2,1-threo insertions and 3,1-isomerizations) per 10,000 propylene units.

10. A propylene polymer composition having:
a) at least 50 mol % propylene;
b) at least 1 mol % comonomer;
c) a 1% secant flexural modulus of at least 1500 MPa;
d) an Mw/Mn of at least 5;
e) a melt flow rate of 50 dg/min or more (230° C., 2.16 kg);
f) more than 15 and less than 200 regio defects per 10,000 propylene units; and
g) a CDBI of 50% or more.

11. A propylene polymer composition having:
a) at least 50 mol % propylene;
b) a 1% secant flexural modulus of at least 1500 MPa;
c) an Mw/Mn of at least 5;
d) a melt flow rate of 50 dg/min or more (230° C., 2.16 kg);
e) a multimodal molecular weight distribution;
f) an RCSV ratio (1 sec$^{-1}$ to 2000 sec$^{-1}$) of Y or more, where Y=38000X$^{-1.559}$, and X is the melt flow rate in dg/min of the propylene polymer.

12. The propylene polymer composition of claim 11, wherein the propylene polymer has an RCSV ratio (1 sec$^{-1}$ to 2000 sec$^{-1}$) of Y or more, where Y=45000X$^{-1.559}$, and X is the melt flow rate in dg/min of the propylene polymer.

13. The propylene polymer composition of claim 11, wherein the propylene polymer composition has an RCSV ratio (1 sec$^{-1}$ to 2000 sec$^{-1}$) of Y or more, where Y=50524X$^{-1.559}$, and X is the melt flow rate in dg/min of the propylene polymer.

14. The propylene polymer composition of claim 11, wherein the propylene polymer composition has more than 17 and less than 175 regio defects per 10,000 propylene units.

15. The propylene polymer composition of claim 11, wherein the propylene polymer composition has a melting point of 145 to 165° C.

16. The propylene polymer composition of claim 11, wherein the propylene polymer composition has a 1% secant flexural modulus of at least 1600 MPa.

17. The propylene polymer composition of claim 9, wherein the propylene polymer composition has an RCSV ratio (1 sec$^{-1}$ to 2000 sec$^{-1}$) of Y or more, where Y=38000X$^{-1.559}$, and X is the melt flow rate in dg/min of the propylene polymer.

18. The propylene polymer composition of claim 10, wherein the propylene polymer composition has an RCSV ratio (1 sec$^{-1}$ to 2000 sec$^{-1}$) of Y or more, where Y=38000X$^{-1.559}$, and X is the melt flow rate in dg/min of the propylene polymer.

19. An impact copolymer comprising the polymer composition of claim 9.

20. A propylene polymer composition produced by the process comprising:
1) contacting propylene, optionally with a comonomer, with a catalyst system comprising an activator and a catalyst compound represented by the formula:

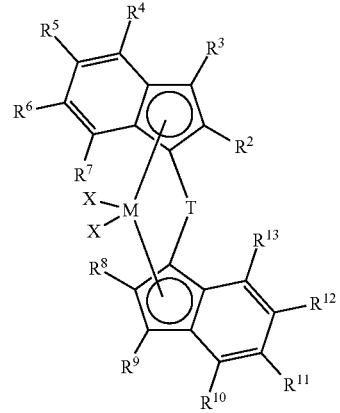

where:
M is a group 4 metal;
T is a bridging group;
X is an anionic leaving group;
each $R^3$, $R^5$, $R^6$, $R^7$, $R^9$, $R^{11}$, $R^{12}$, and $R^{13}$ is independently, hydrogen, hydrocarbyl, substituted hydrocarbyl, halocarbyl, substituted halocarbyl, silylcarbyl, substituted silylcarbyl, germylcarbyl, or substituted germylcarbyl substituents;
each $R^2$ and $R^8$ is independently, a halogen atom, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR, —OSiR'$_3$ or —PR'$_2$ radical, wherein R' is one of a halogen atom, a $C_1$-$C_{10}$ alkyl group, or a $C_6$-$C_{10}$ aryl group;
$R^4$ and $R^{10}$ are, independently, a substituted or unsubstituted aryl group;
2) polymerizing the propylene and optional comonomer for a time period, A;
3) adding hydrogen or other chain termination agent and optional comonomer to the polymerization after time period A;
4) polymerizing in the presence of at least 1 mmol hydrogen per mol of propylene for a time period, B, where time period A is at least as long as time period B and the hydrogen concentration during time period B is at least three times greater than the hydrogen concentration in time period A; and
5) obtaining a propylene polymer composition having:
a) at least 50 mol % propylene;
b) a 1% secant flexural modulus of at least 1500 MPa;
c) an Mw/Mn of at least 5;
d) a melt flow rate of 50 dg/min or more (230° C., 2.16 kg);
e) a multimodal molecular weight distribution; and
f) more than 15 and less than 200 regio defects (sum of 2,1-erythro and 2,1-threo insertions and 3,1-isomerizations) per 10,000 propylene units.

21. An injection molded article comprising the propylene polymer composition produced in claim 20, where the propylene polymer composition has a 1% secant flexural modulus at least 150 MPa greater than the polymer produced after time period A.

22. The propylene polymer composition of claim 20, wherein the propylene polymer composition produced after time period B has a 1% secant flexural modulus at least 150 MPa greater than the polymer produced after time period A.

23. The propylene polymer composition of claim 20, wherein the propylene polymers made in stages A and B are both isotactic polypropylene, but are different in at least one of Mw, MFR, tacticity, comonomer content, Tm, Tc, Hf, or 1% Secant flexural modulus by more than 5% relative to each other.

24. The propylene polymer composition of claim 20, wherein propylene is combined with the catalyst system the time period A to produce Component A, hydrogen is added for the time period B to produce Component B, and then comonomer is added for a time period, C, to produce Component C.

\* \* \* \* \*